(12) United States Patent
Abrahamsson et al.

(10) Patent No.: US 9,477,091 B2
(45) Date of Patent: Oct. 25, 2016

(54) MULTI-DIMENSIONAL IMAGING USING MULTI-FOCUS MICROSCOPY

(71) Applicant: Howard Hughes Medical Institute, Chevy Chase, MD (US)

(72) Inventors: Sara Abrahamsson, New York, NY (US); Mats G. L. Gustafsson, Chevy Chase, MD (US)

(73) Assignee: Howard Hughes Medical Institute, Chevy Chase, MD (US)

( * ) Notice: Subject to any disclaimer, the term of this patent is extended or adjusted under 35 U.S.C. 154(b) by 695 days.

(21) Appl. No.: 13/739,310

(22) Filed: Jan. 11, 2013

(65) Prior Publication Data

US 2013/0176622 A1    Jul. 11, 2013

Related U.S. Application Data

(60) Provisional application No. 61/585,375, filed on Jan. 11, 2012, provisional application No. 61/616,289, filed on Mar. 27, 2012, provisional application No. 61/731,130, filed on Nov. 29, 2012.

(51) Int. Cl.
*G02B 27/42* (2006.01)
*G02B 21/36* (2006.01)
(Continued)

(52) U.S. Cl.
CPC ......... *G02B 27/4205* (2013.01); *G02B 21/367* (2013.01); *G02B 27/0075* (2013.01); *G02B 27/1086* (2013.01); *G02B 27/4211* (2013.01)

(58) Field of Classification Search
CPC .. G02B 27/4205; G02B 5/18; G02B 27/646; G02B 27/644; G02B 5/1814; G02B 27/46; G02B 5/1876; G02B 5/1857; G02B 5/32; G02B 5/1866; G02B 5/1861; G02B 27/1086; G02B 21/376; G02B 27/0075; G02B 27/4211; G11B 7/1353; G11B 2007/0006

USPC ......... 359/556, 558–590, 368–398, 1–35, 67
See application file for complete search history.

(56) References Cited

U.S. PATENT DOCUMENTS 5,264,928 A * 11/1993 Howes ............................ 348/79
5,528,369 A *  6/1996 Starkey ......................... 356/491
(Continued)

FOREIGN PATENT DOCUMENTS

GB          2353392 A      2/2001
WO       WO0113159 A1     2/2001
(Continued)

OTHER PUBLICATIONS

Abrahamsson et al., "Fast and Sensitive 3D Imaging using Simultaneous Multi-Focus Microscopy", University of California San Fransisco and HHMI Janelia Farm Research Campus, Jul. 12, 2010, 1 page.

Blanchard et al., "Broadband simultaneous multiplane imaging", Optics Communications, vol. 183, Elsevier Science B. V., Sep. 1, 2000, pp. 29-36.

(Continued)

*Primary Examiner* — Scott J Sugarman
*Assistant Examiner* — Kristina Deherrera
(74) *Attorney, Agent, or Firm* — DiBerardino McGovern IP Group LLC

(57) ABSTRACT

An optical imaging system includes a first diffractive optical element that receives a multi-wavelength beam of light and separates the received beam of light into diffractive orders. The optical imaging system also includes a second diffractive optical element that includes panels displaced along the second diffractive element in at least one direction, where each panel is positioned to receive and pass the multi-wavelength beam of one of the diffractive orders. A refractive optical element is positioned to receive multi-wavelength beams of the diffractive orders that pass through the second diffractive element, and an optical lens that receives the multi-wavelength beams of the diffractive orders that pass through the refractive element and focuses each of the multi-wavelength beams of the diffractive orders to a different location on an image plane at the same time.

44 Claims, 22 Drawing Sheets

(51) Int. Cl.
  *G02B 27/10* (2006.01)
  *G02B 27/00* (2006.01)

(56) References Cited

U.S. PATENT DOCUMENTS

| | | | |
|---|---|---|---|
| 5,892,748 A | 4/1999 | Kikuchi | |
| 6,243,198 B1* | 6/2001 | Sedlmayr | 359/487.02 |
| 2001/0009476 A1* | 7/2001 | Iizuka | 359/566 |
| 2001/0035991 A1* | 11/2001 | Hobbs et al. | 359/35 |
| 2002/0003661 A1* | 1/2002 | Nakai | G02B 5/1809 359/569 |
| 2002/0005938 A1 | 1/2002 | Omura | |
| 2002/0054299 A1 | 5/2002 | Freifeld | |
| 2006/0082882 A1* | 4/2006 | Wang | G02B 5/1895 359/558 |
| 2007/0216887 A1* | 9/2007 | Singer et al. | 355/67 |
| 2010/0149619 A1* | 6/2010 | Olaya | 359/285 |

FOREIGN PATENT DOCUMENTS

| | | |
|---|---|---|
| WO | 2008032061 A2 | 3/2008 |
| WO | 2011085765 A1 | 7/2011 |

OTHER PUBLICATIONS

Gansel et al., "High-speed, 3-dimensional, telecentric imaging", Optics Express, vol. 14, No. 18, Sep. 4, 2006, pp. 8269-8277.
Dalgarno et al., "Multiplane imaging and three dimensional nanoscale particle tracking in biological microscopy", Optics Express, vol. 18, No. 2, Jan. 18, 2010, pp. 877-884.
Mait, Joseph N., "Understanding diffractive optic design in the scalar domain", J. Opt. Soc. Am. A, vol. 12, No. 10, Oct. 1995, pp. 2145-2158.
Maurer et al., "Depth of field multiplexing in microscopy", Optics Express, vol. 18, No. 3, Feb. 1, 2010, pp. 3023-3034.
Blanchard et al., "Simultaneous multiplane imaging with a distorted diffraction grating", Applied Optics, vol. 38, No. 32, Nov. 10, 1999, pp. 6692-6699.
International Search Report and Written Opinion for PCT/US2013/021266, mailed Apr. 29, 2013, 9 pages.
Eyal Ben-Eliezer et al., "All-optical extended depth of field imaging system," Journal of Optics: Pure and Applied Optics, Institute of Physics Publishing, Bristol, GB, vol. 5, No. 5, Sep. 1, 2003, pp. SI64-SI69.
Extended European Search Report for counterpart European Application No. 13736368.7, European Patent Office, issued Jul. 22, 2015, 8 pages.

* cited by examiner

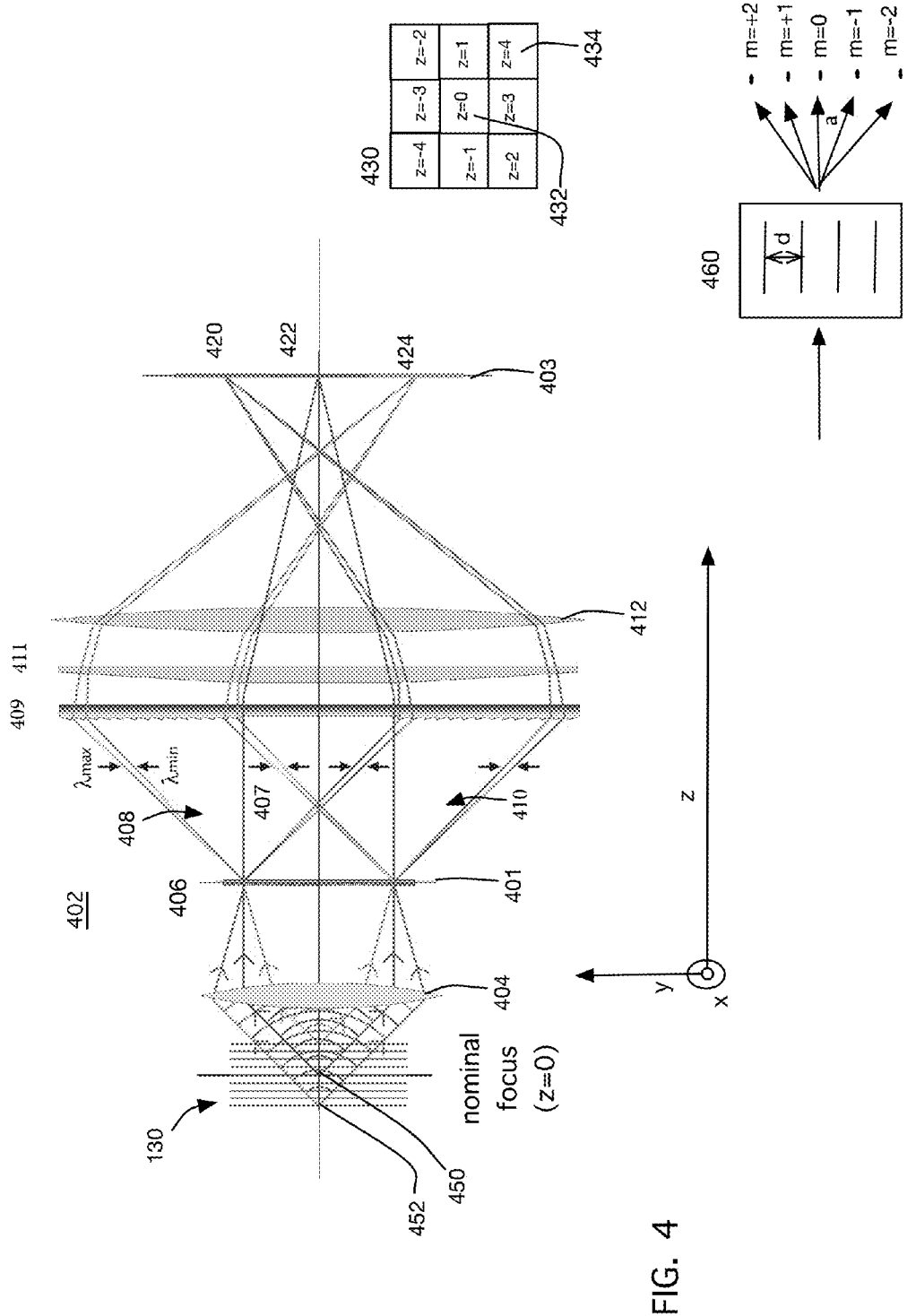

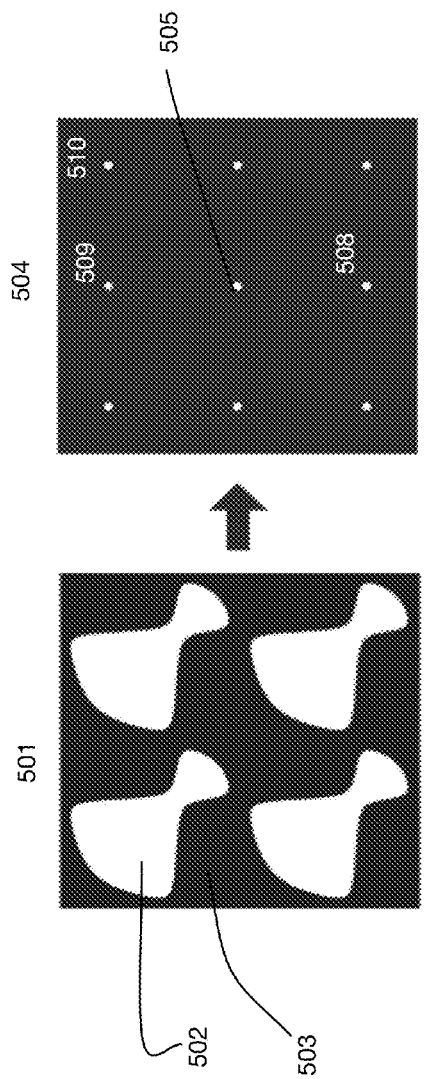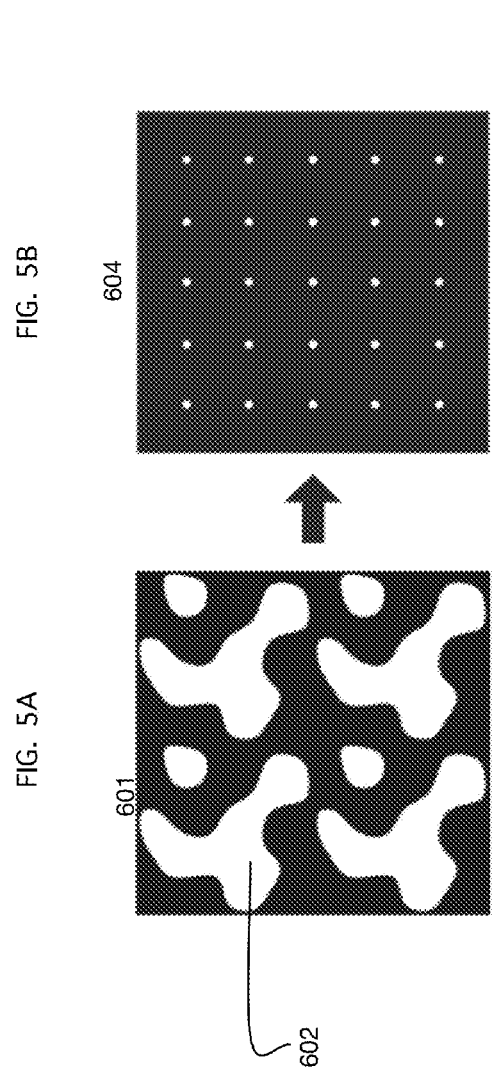

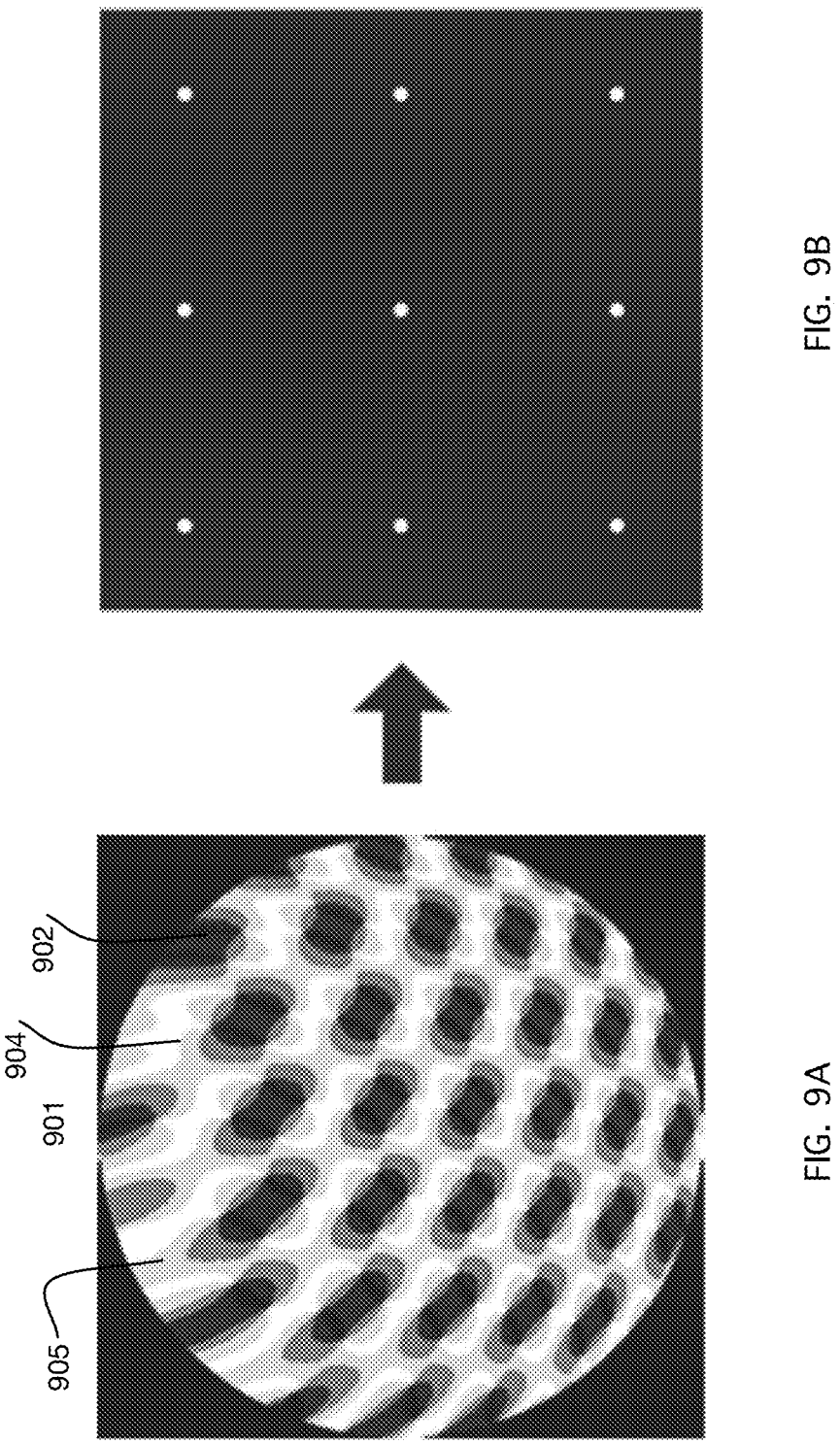

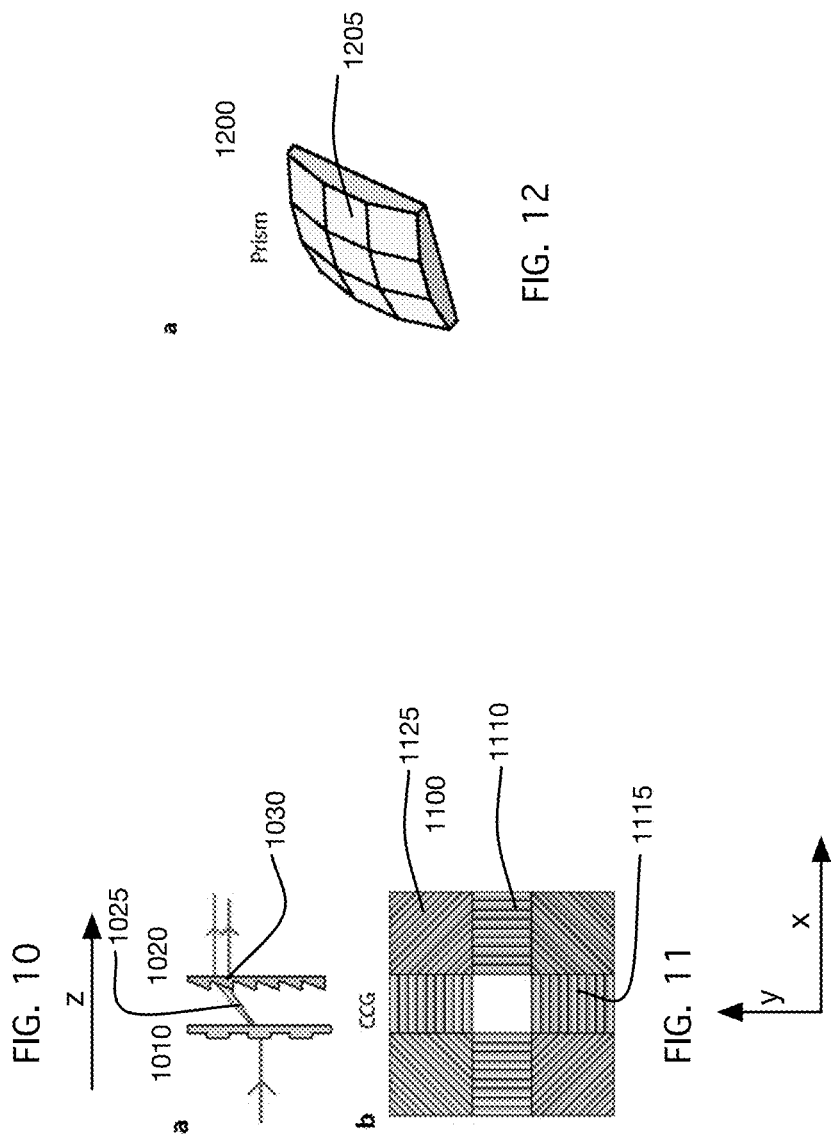

MULTI-DIMENSIONAL IMAGING USING MULTI-FOCUS MICROSCOPY

CROSS-REFERENCE TO RELATED APPLICATIONS

This application claims priority to U.S. Application No. 61/585,375, filed on Jan. 11, 2012 and entitled "MULTI-COLOR THREE DIMENSIONAL IMAGING USING MULTI-FOCUS MICROSCOPY," which is incorporated herein by reference in its entirety; U.S. Application No. 61/616,289, filed on Mar. 27, 2012 and entitled "MULTI-COLOR THREE DIMENSIONAL IMAGING USING MULTI-FOCUS MICROSCOPY," which is incorporated herein by reference in its entirety; and U.S. Application No. 61/731,130, filed on Nov. 29, 2012 and entitled "MULTI-COLOR THREE DIMENSIONAL IMAGING USING MULTI-FOCUS MICROSCOPY," which is incorporated herein by reference in its entirety.

TECHNICAL FIELD

This disclosure relates to multi-dimensional imaging using multi-focus microscopy.

BACKGROUND

Biological samples can be imaged using a microscope. Many biological samples include three-dimensional structures, and imaging the structures in three dimensions can provide additional information about the structure. A three-dimensional structure includes planes that are at different depths within the structure. Changing the position of the sample relative to the microscope can bring each plane in the structure into focus at a different time. In this manner, a three-dimensional image of the structure can be built up over a period of time from the images of the individual planes.

SUMMARY

In one general aspect, an optical imaging system includes a first diffractive optical element that receives a multi-wavelength beam of light and separates the received beam of light into diffractive orders, with each diffractive order including a multi-wavelength beam of light that propagates away from the first diffractive element in a different direction. The optical imaging system also includes a second diffractive optical element that includes panels displaced along the second diffractive element in at least one direction, where each panel is positioned to receive and pass the multi-wavelength beam of one of the diffractive orders, a refractive optical element positioned to receive multi-wavelength beams of the diffractive orders that pass through the second diffractive element, and an optical lens that receives the multi-wavelength beams of the diffractive orders that pass through the refractive element and focuses each of the multi-wavelength beams of the diffractive orders to a different location on an image plane at the same time.

Implementations can include one or more of the following features. In use, the first diffractive element can be positioned in the Fourier plane of a separate imaging system. The refractive element can include a prism having a surface that receives the multi-wavelength beams of the diffractive orders that pass through the second diffractive element, the surface including facets that are substantially flat. Each facet can be positioned to receive the multi-wavelength beam of one of diffractive orders that passes through the second diffractive element. The prism can be a single piece of material that transmits at least one wavelength in the multi-wavelength beam of light. The prism can be formed from multiple pieces. The second diffractive element can be a blazed diffraction grating. The second diffractive element can include panels in a periodic arrangement that extend along a surface of the second diffractive element in two directions that are orthogonal to each other. The second diffractive element can be a single piece. The second diffractive element can include multiple-pieces that, in use, are assembled together to form the second diffractive element. The first diffractive element can introduce chromatic dispersion onto the diffractive orders, and passing the diffractive orders through the second diffractive element can remove substantially all of the chromatic dispersion over a wavelength bandwidth. The wavelength bandwidth can be about 30-50 nm. The first diffractive element can be one of a binary or a multi-phase phase only diffraction grating.

In some implementations, the optical system also can include a housing that encloses the first diffractive element, the second diffractive element, the refractive element, and the lens. The housing can define a first opening on a first side, the first opening positioned to allow light to enter the housing and propagate towards the first diffractive element, and the housing can define a second opening on a second side, with the second opening being positioned to receive light exiting the lens. The housing can include a connection on the first opening to couple the first opening to a camera port of a microscope, followed by an optical lens that forms a Fourier plane where the first diffractive element is positioned, and a connection on the second opening to couple the second opening to a camera.

The multi-wavelength beam of light that the first diffractive element receives can include light from multiple depths within an imaged volume, and each of the multi-wavelength beams focused at a different location on the image plane can correspond to an image of the volume at one of the depths. The multi-wavelength beam of light can include an output beam from one of a microscope or a photographic camera. The multi-element holder with selectable positions, each position including a different diffractive element, and selection of a particular diffractive element can determine a distance between each of the multiple depths. A housing can contain the first diffractive element, the second diffractive element, the refractive element, the multi-element holder, and the lens, and the elements of the multi-element holder can be selectable from an exterior of the housing.

In some implementations, the first diffractive element can direct multi-wavelength light towards multiple depths within a volume to be imaged. The first diffractive element can be inside of an imaging objective. The multi-wavelength beam of light can include fluorescence from an illuminated biological sample. The multi-wavelength beam of light can include a wavelength band selected such that the second diffractive element removes all residual chromatic dispersion. The optical lens that focuses each of the multi-wavelength beams of the diffractive orders can be an array of lenses.

In another general aspect, an imaging system includes a dichroic mirror positioned to receive a multi-wavelength beam of light, and a first color channel and a second color channel that receive, respectively, a light beam of a first color from the dichroic mirror and a light beam of a second color from the dichroic mirror. Each of the first color channel and the second color channel include a first diffractive element including a diffraction pattern, the first diffractive element configured to separate the light beam into diffractive orders, each diffractive order including a beam of light, a module including a second diffractive element and a refractive element, the module being positioned to receive and transmit the diffractive orders that propagate away from the first diffractive element, and a lens that receives the beams of the diffractive orders that pass through the module and focuses each of the beams to a different location on an image plane at the same time. The first diffractive element in the first color channel has a diffraction pattern that is proportional to a wavelength of the first color, and the first diffractive element in the second color channel has a grating pattern that is proportional to a wavelength of the second color.

In another general aspect, a method of imaging includes passing a multi-wavelength beam of light through a first diffractive element to generate diffractive orders, each diffractive order including a multi-wavelength beam of light that propagates away from the first diffractive element in a different direction, passing each of the beams of the multiple diffractive orders through a different panel of a second diffractive element, and passing the beams of the multiple diffractive orders that pass through the second diffractive element through a refractive element.

Implementations can include one or more of the following features. The beams of the diffractive orders that exit the prism can be passed through a lens to focus the beams onto the different locations of the imaging plane. Passing the beams of the multiple diffractive orders through a prism can include passing each of the beams of the diffractive orders through a different facet on a surface of the prism.

In another general aspect, a method of generating a three-dimensional representation of a volume of material includes receiving a multi-wavelength beam of light, the beam of light including light from different depths within a volume of material; generating, from the received beam of light, multiple beams that are spatially distinct from each other, each of the multiple beams including light from a particular one of the different depths within the volume of material; correcting the multiple beams that are spatially distinct from each other for chromatic dispersion; directing each of the multiple beams that are spatially distinct from each other onto a different portion of an image plane at substantially the same time; and generating a three-dimensional representation of the volume of material based on the directed multiple beams, the three-dimensional representation of the volume of material including a two-dimensional image of two or more of the different depths within the volume of material.

Implementations can include one or more of the following features. Directing each of the multiple beams that are spatially distinct from each other can include focusing each of the multiple beams onto different portions of the image plane.

Implementations of any of the techniques described above may include an assembly, an apparatus, a system, a microscope objective that includes a multi-focus diffraction grating, a kit for retrofitting an existing microscope, instructions, stored on an electronic storage medium that, when executed, cause an electronic processor to execute a process for designing a component of an imaging system, or a method. The details of one or more implementations are set forth in the accompanying drawings and the description below. Other features will be apparent from the description and drawings, and from the claims.

DRAWING DESCRIPTION

FIG. 4 is a side schematic view of an optical imaging system.

FIG. 4A is an illustration of an example periodic line grating.

FIGS. 5A and 6A are illustrations of grating functions that generate fan-out arrays of evenly distributed diffractive orders.

FIGS. 5B and 6B are illustrations of the diffractive patterns of the grating functions of FIGS. 5A and 6A, which have respectively, the function of directing light into the central 3×3 and 5×5 diffractive orders.

FIG. 9A is an illustration of an example multi-phase (phase-only) diffraction grating.

FIG. 9B is an illustration of the diffraction pattern of the grating of FIG. 9A.

FIG. 10 is a side view of an example binary phase grating and a blazed grating.

FIG. 11 is a front view of an exemplary color corrective grating for multi-focus microscopy.

FIG. 12 is a perspective view of an exemplary prism for multi-focus microscopy.

Figure 23:
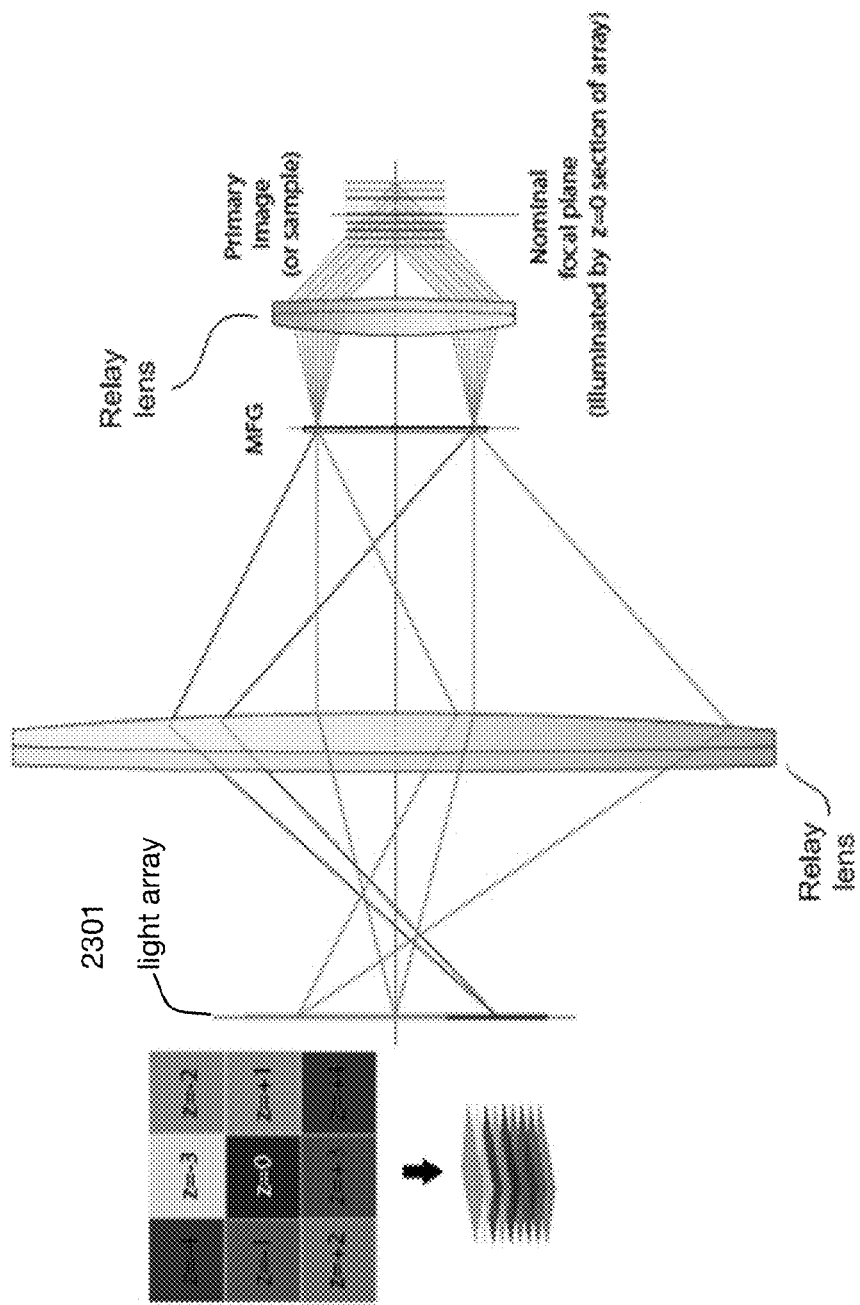
Figures 24A, 24B:
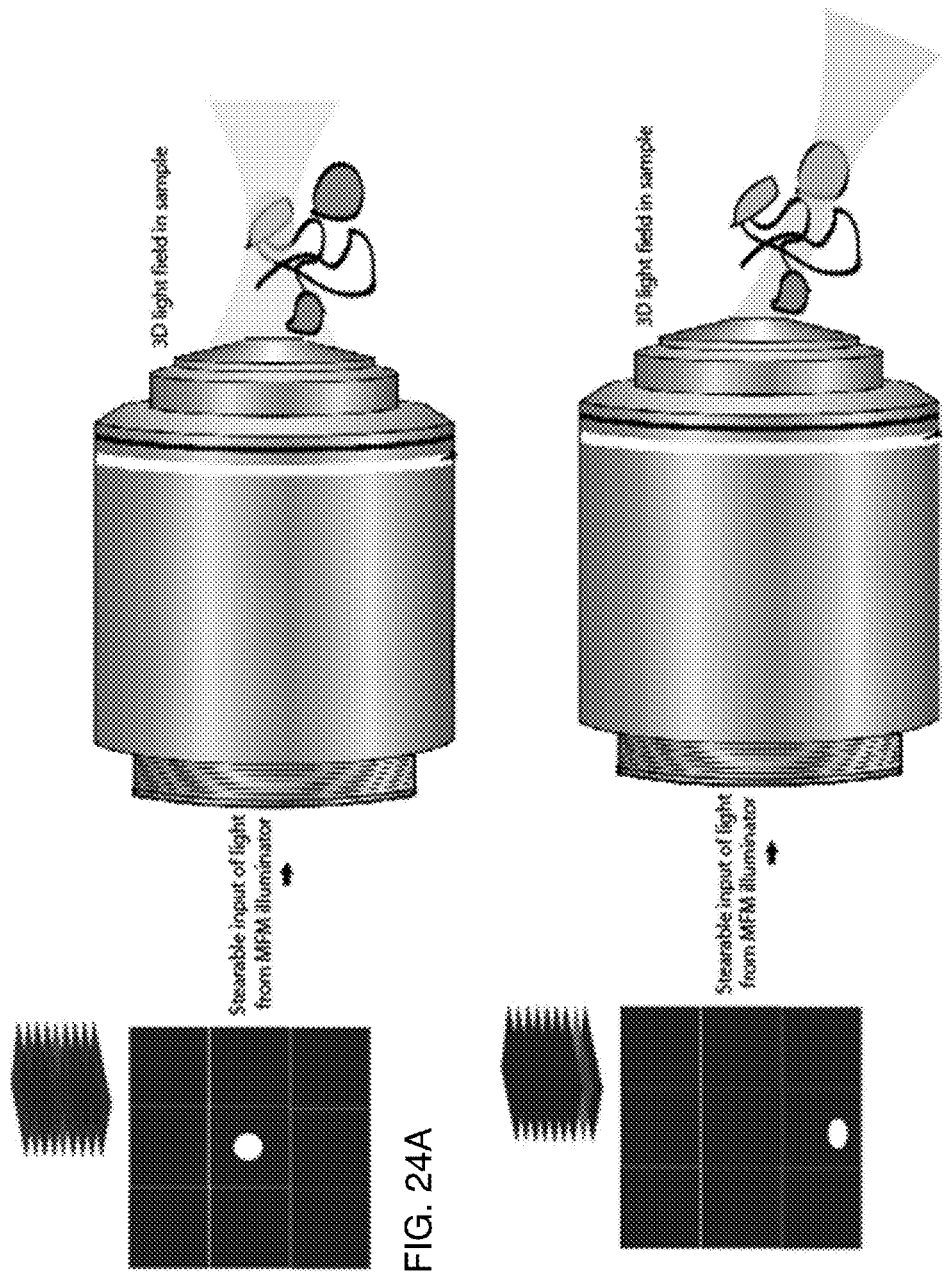

FIGS. 23, 24A, and 24B are example steerable illumination systems that include an MFG.

Like reference numbers refer to like elements.

DESCRIPTION

A technique for acquiring multi-color three-dimensional images of a sample volume is described. The imaging system discussed below forms a three-dimensional focal stack that can be recorded in a single exposure of a single camera, leaving only signal strength and camera frame rate to limit acquisition speed. The imaging technique can be referred to as multifocus imaging. As discussed below, the imaging system allows multiple planes that are at different depths within the sample to be imaged onto a sensor at the same time. The imaging system produces a three-dimensional representation of a three-dimensional space or imaged volume without moving the camera, the microscope, or the imaged volume.

Fast acquisition of three-dimensional data is important in biological microscopy. Many imaging modalities, such as wide-field, laser-scanning confocal, spinning-disk confocal, and light-sheet microscopy record information one focal plane at a time. Three-dimensional images may be assembled from the information recorded from each focal plane using sequential mechanical refocusing. Mechanical refocusing involves movement of one or more components of the imaging system or the imaged sample. For example, the relative position of the sample and the microscope can be changed to bring each focal plane in the sample into focus at a different time to make a series of images, one image of each of the planes.

However, such modalities can be slower than a technique that captures information from multiple focal planes simultaneously. Additionally, because mechanical refocusing techniques capture the image of each depth plane in the sample at a different time, the information recorded from each plane may be ambiguous, particularly when imaging a sample volume that includes portions that evolve quickly in time. Further, movement of the sample, the microscope stage, and/or the microscope during mechanical refocusing can disturb the sample. In contrast, the technique discussed below acquires data from multiple depth planes simultaneously to form multi-color images of a volume (a focal stack) without moving the microscope stage, the sensor, or any other component of the imaging system.

Figure 1:
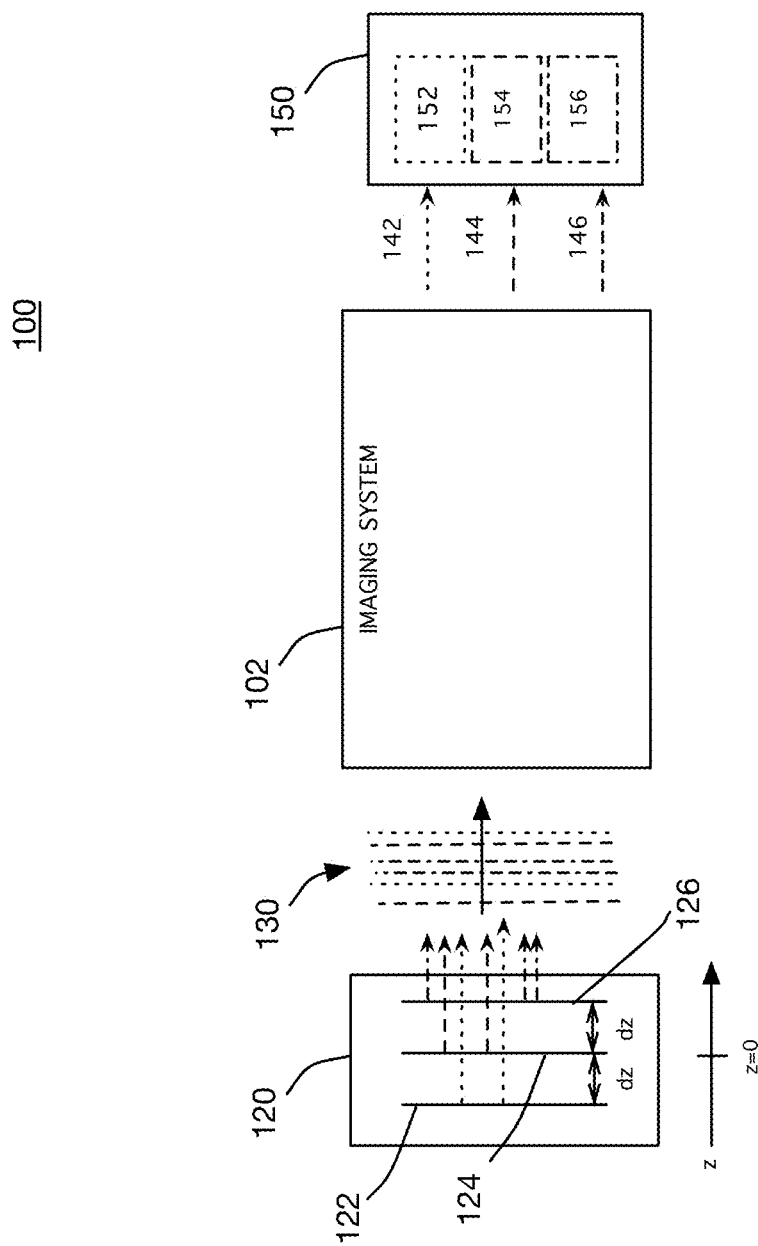
FIG. 1 is a block diagram of an example system that includes an optical imaging system for imaging a volume.

FIG. 1 shows a block diagram of an example system 100 that produces a three-dimensional representation of a volume 120. The system 100 includes an imaging system 102 that images the volume 120 onto a sensor 150. As discussed below, the imaging system 102 can be used with a microscope to generate multi-color, three-dimensional, aberration-corrected images of the volume 120 at a particular instance in time, without mechanical refocusing or otherwise moving the microscope, the sensor 150, or any of the components of the imaging system 102.

The volume 120 can be any three-dimensional volume. The volume 120 can be a live biological sample that includes three-dimensional structures, some of which are in motion during the imaging of the volume 120. The volume 120 may take other forms. For example, the volume 120 can be a space, region, object, or a collection of discrete items that does not have a well-defined boundary, such as a flow through a biological structure that is undergoing rapid change. The volume 120 can be, or can include, a non-biological item, such as an inorganic chemical compound or a fluid that flows through or is contained by an inorganic item.

The three-dimensional representations produced by the system 100 can be referred to as focal stacks. A focal stack is a collection of two-dimensional images. In the example shown in FIG. 1, the images 152, 154, and 156, which are, respectively, images of sample depths 122, 124, and 126, form all or part of a focal stack. Each of the sample depths 122, 124, and 126 are regions or planes that are at different positions along the "z" direction within the volume 120. The arrow labeled "z" in FIG. 1 shows a direction of decreasing depth within the volume 120.

The imaging system 102 uses a diffractive element (not shown in FIG. 1, but discussed in detail below) to spatially separate and focus the light from each of the depths 122, 124, and 126 into diffractive orders and a correction module (not shown) to remove chromatic aberrations and direct rays 142, 144, and 146 towards the camera sensor 150. The diffractive element 102 is a multi-focus diffractive grating (MFG), which is discussed in greater detail below. The imaging system 102 generates the two-dimensional images 152, 154, and 156 from the rays 142, 144, and 146 simultaneously to generate the three-dimensional representation of the volume 120.

Figure 2:
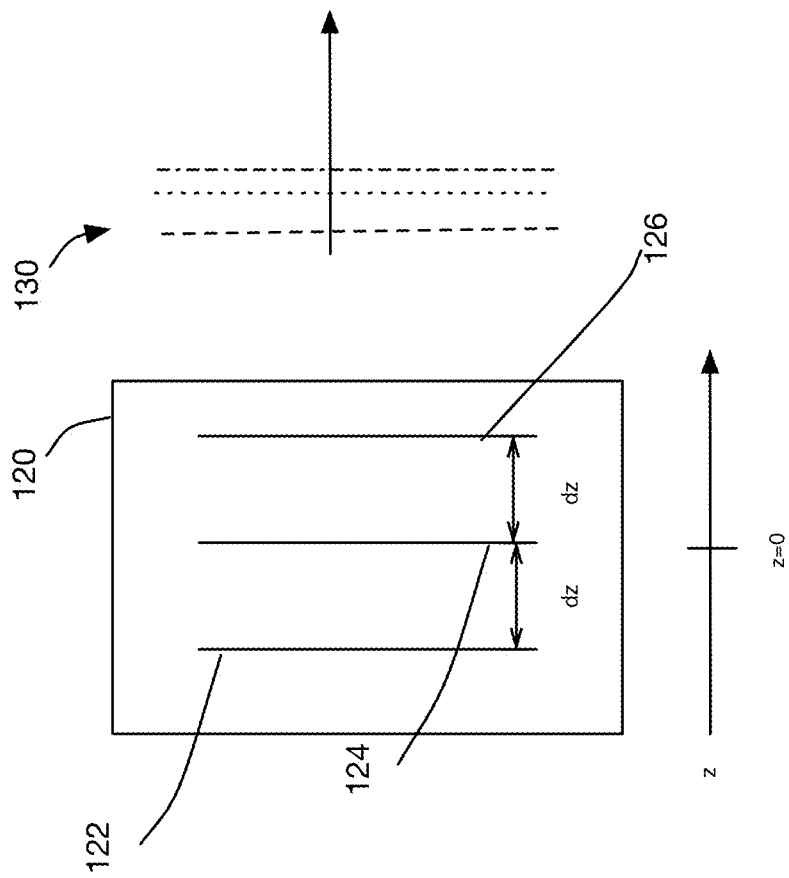
FIG. 2 is a side view of the volume of FIG. 1.

FIG. 2 shows a side view of the volume 120 at a particular instance in time. Within the volume 120, there are multiple planes or depth planes 122, 124, and 126, each of which can be considered to be a two-dimensional slice of the volume 120 at a particular depth "z." In the example shown in FIGS. 1 and 2, the volume 120 includes the depths 122, 124, and 126. The volume 120 includes a range of depths along with direction "z," but it should be noted that only the depths 122, 124, and 126 are described herein to simplify the discussion. The depths 122, 124, and 126 are separated from each other in the "z" direction by a distance "$\Delta z$" (also referred to as "dz"). The distance "$\Delta z$" can be referred to as the focus step or the focal plane separation. The focus step can be, for example, between about 380 nm and 2 µm. As discussed in greater detail below with respect to FIG. 15, the size of the focus step is determined by the design of a multi-focus diffractive grating (MFG) that is included in the imaging system 102.

Figure 3:
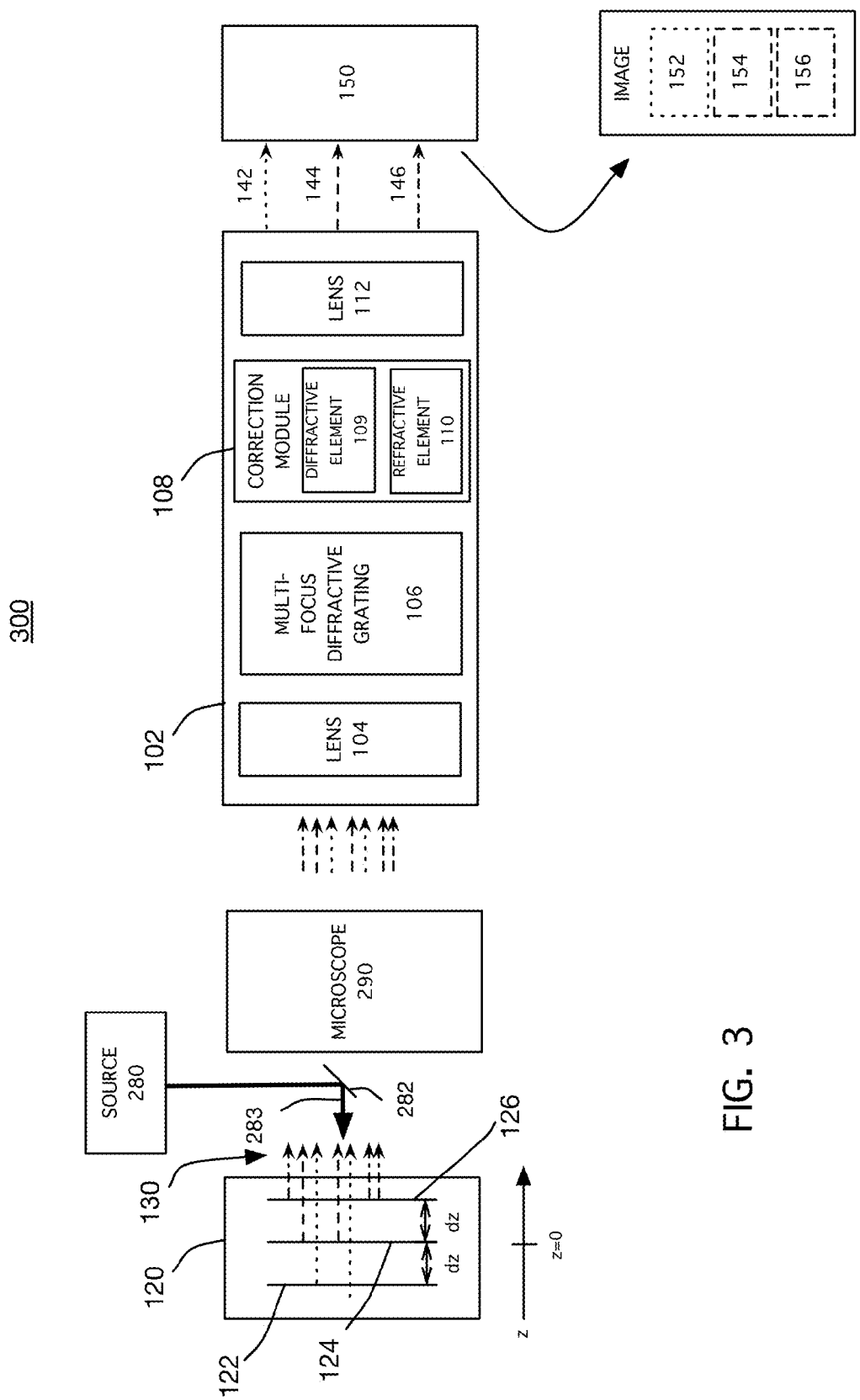
FIG. 3 is a block diagram of an example system that includes the optical imaging system of FIG. 1.

Referring to FIG. 3, a block diagram of an example system 300 that includes the imaging system 102 is shown. To image the volume 120, light 283 from a light source 280 is reflected off of a beam splitter 282 and directed towards the sample 120. The source 280 can be, for example, an excitation laser that emits light at 488 nm and/or 560 nm. A portion of the light 283 enters the volume 120, and light 130 is emitted from the volume 120.

The light 130 emitted from the volume 120 includes light from the depth planes 122, 124, and 126. The light 130 emitted from the volume 120 can be light that is reflected from structures at the depth planes 122, 124, and 126, transmitted through structures at the depths 122, 124, and 126, and/or fluorescence that is emitted from structures at the depth planes 122, 124, and 126 in response to being irradiated by the light from the source 280. The light 130 can be broadband light (or multi-color light) that includes more than one or two wavelengths. For example, the light 130 can be fluorescence that is emitted from structures and material in the volume 120 in response to irradiation by the light 130. The fluorescence can have a bandwidth of about 30-50 nm. When imaging larger structures, the light 130 may include all or most of the visible spectrum.

The system 300 also includes the microscope 290 with which the system 102 is used. The system 102 is appended to a camera port of the microscope 290, after the location where the objective and tube lens of the microscope 290 form the primary image. The light 130 enters the microscope 290 and is focused to the primary image plane 292 and then propagates to the imaging system 102. The microscope 290 can be any type of wide-field light microscope. For example, the microscope 290 can be an epifluorescence microscope.

The system 102 includes a relay lens 104, a multi-focus diffraction grating 106, a correction module 108 that includes a diffractive optical element 109 and a refractive optical element 110, and a lens 112. The lenses 104 and 112 are relay lenses that create a conjugate pupil plane (a Fourier plane) and a final image plane. The multi-focus diffractive grating 106 is located at the Fourier plane, and the camera 150 is positioned at the final image plane. As discussed in greater detail with respect to FIG. 4, the MFG 106 separates the light 130 into diffractive orders, with each diffractive order corresponding to a sub-image of one of the depth planes 122, 124, and 126. The MFG 106 refocuses out-of-focus sub-images that are made from light from depth planes that are not at the nominal focus of the microscope 290. The refocusing function is calculated according to the Abbe sine condition to provide aberration-free refocusing. Unlike techniques that tend to induce spherical aberration, such as quadratic refocusing functions, or refocusing by translating the sensor, calculating the refocusing function according to the Abbe sine condition provides superior performance by minimizing or eliminating depth-induced spherical aberration.

The diffractive optical element 109 of the correction module 108 removes chromatic aberration introduced by the MFG 106 from the diffractive orders, and the refractive optical element 110 directs the diffractive orders towards spatially distinct locations on the camera 150. The diffractive orders exit the imaging system 102 as beams of light 142, 144, and 146, which correspond to sub-images of the focal planes 122, 124, and 126, respectively. The beams 142, 144, and 146 are received at different locations on the sensor 150 at the same time. In this manner, a three-dimensional representation of the volume 120 is generated (without mechanical refocusing) by simultaneously producing focused images of each of the depths 122, 124, and 126 at the camera 150.

FIG. 4 shows a side schematic view of an imaging system 402. In the example of FIG. 4, nine depth planes are imaged in the sample 120, and a 3×3 array of images 430, one image of each of the nine planes, is produced. The number of depth planes is determined by the design of an MFG 406 that is included in the imaging system 402.

Figure 8A:
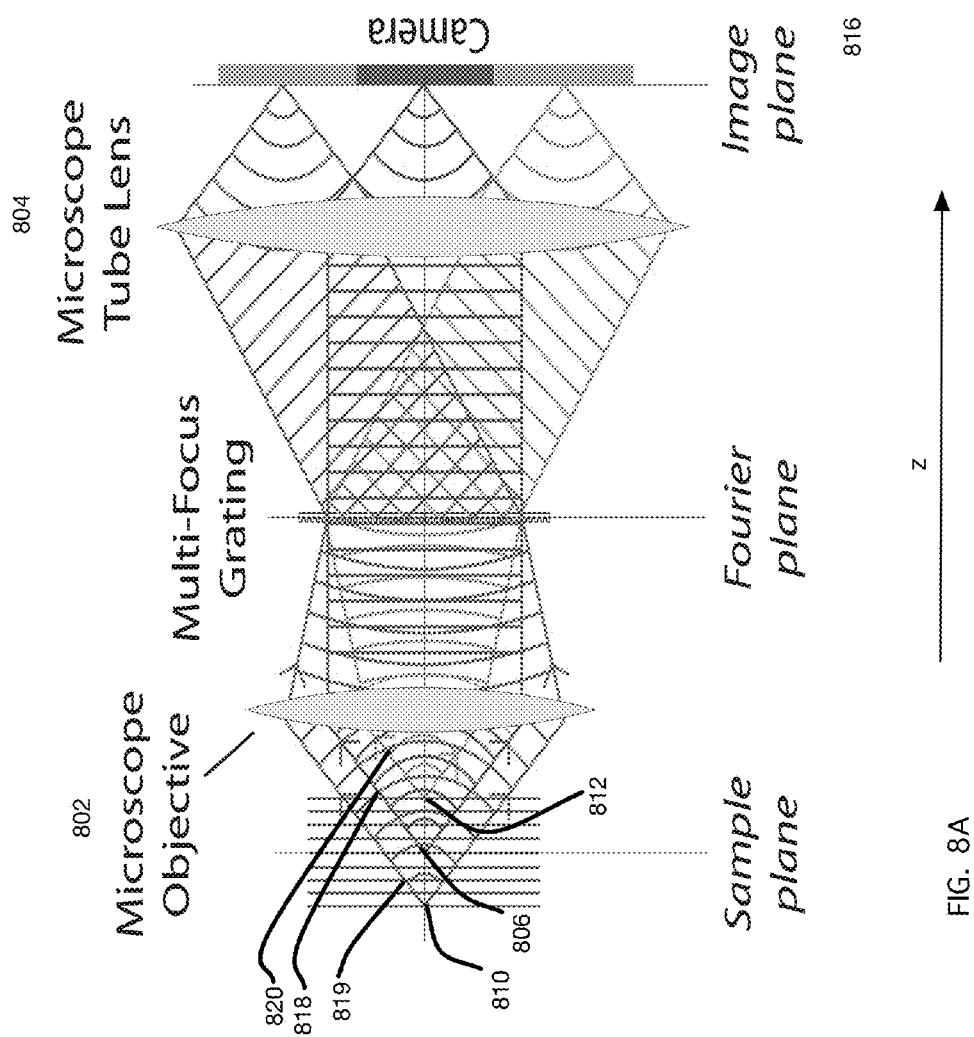
FIGS. 8A and 8B show side schematic views of optical systems that include the grating of FIG. 7.

The imaging system 402 is here positioned relative to an image plane of another optical system, such as a microscope (not shown) that images a sample volume 120 and transmits light 130 from the sample volume through a camera port. In this configuration the imaging system 402 is positioned downstream (in the direction of increasing "z") from a location where the microscope forms a primary image. Other configurations are possible. For example, FIG. 8A shows a configuration in which an MFG is placed in the pupil plane and relay optics are not needed.

The light 130 enters and propagates through the imaging system 402 in the "z" direction. The imaging system 402 includes relay lenses 404 and 412 that form a secondary pupil plane (the secondary Fourier plane) 401 and a final image plane 403. The relay lens 404 can have a focal length of, for example, 150 mm and the relay lens 412 can have a focal length of, for example, 200 mm. The second relay lens 412 can be made from a single-piece element or formed from an array of smaller lenses. An array of smaller lenses can make the system 402 more convenient to implement in some cases. For example, in cases in which the second relay lens 412 has a large diameter to transmit all the beams of light from the different focal planes. Large diameter lenses tend to be less well corrected for aberrations, and are relatively thick, leading to light loss by absorption.

Figure 4B:
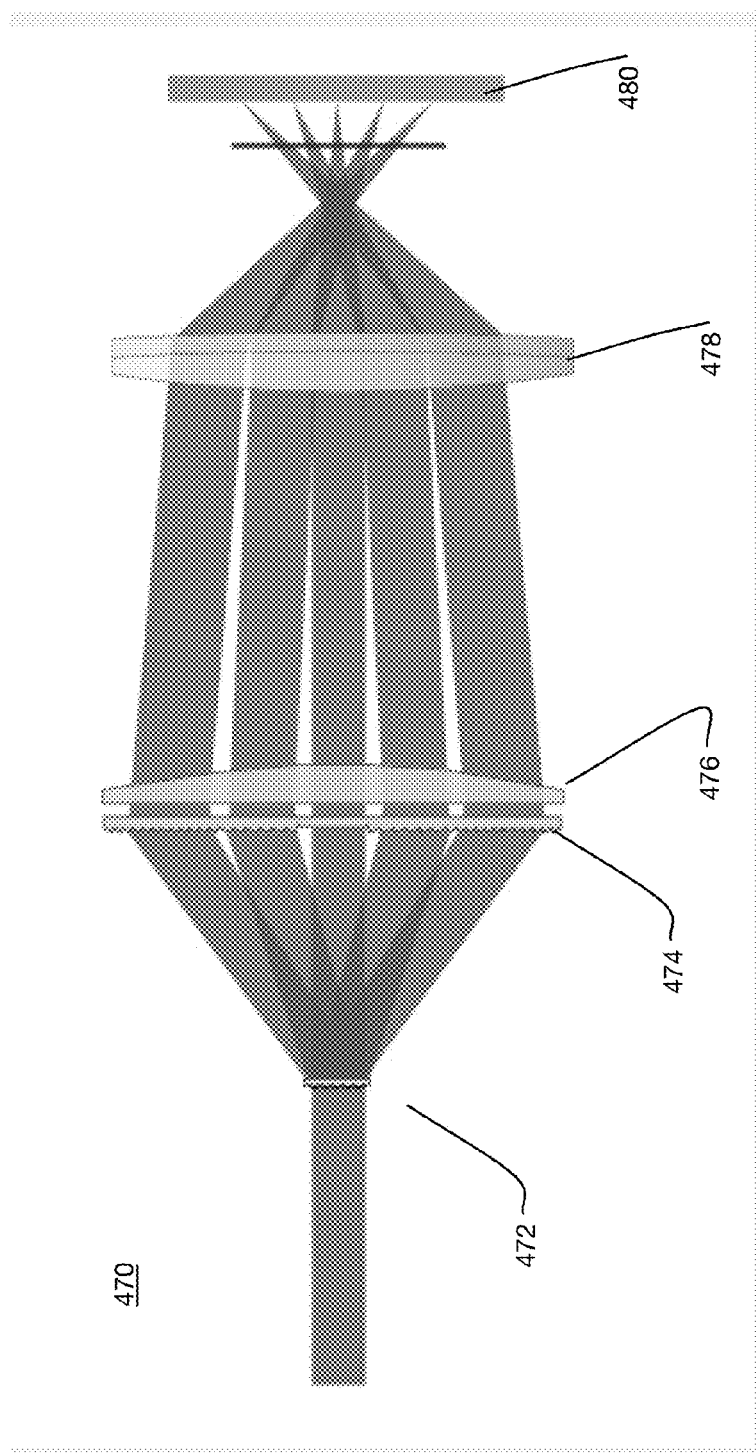
FIG. 4B is an illustration of another optical imaging system.

A multi-focus diffractive grating (MFG) 406 is placed in the Fourier plane 401 to form a multi-focus image. In this example, the MFG 406 separates the incoming light 130 into nine diffractive orders, three of which are shown in the ray-tracing diagram of FIG. 4. (All nine orders are shown in the array of images 430.) Because FIG. 4 is a cross-sectional view of the system 402 from the side, and to simplify the discussion, only three diffractive orders, the diffractive orders 407, 408, and 410, are shown in the illustration. The diffractive order 407 is the central, non-diffracted order. The light in the diffractive order 407 propagates through the system 402 in the "z" direction and continues to propagate in the "z" direction after passing through the MFG 406. The diffractive orders 408 and 410 enter the system 402 in the "z" direction and are diffracted by the MFG 406 (deflected away from the "z" direction in the "x" and "y" directions). As a result, light in the orders 408 and 410 is deflected relative to the "z" direction. The remaining six diffractive orders are behind or in front (into or out of the page in the "x" direction) of the diffractive orders 407, 408, and 410. The light in the six other diffractive orders also propagates away from the MFG 406 in a direction that is deflected relative to the direction "z." The nine diffractive orders (including the diffractive orders 407, 408, and 410) form the image array 430. Furthermore, by selecting a particular design of the MFG used in the imaging system, different numbers of diffractive orders can be produced. For example, and as shown in FIG. 6A, a grating function can be designed for an MFG so that the MFG produces 25 diffractive orders (FIG. 6B). Such an MFG is used to make a system that images 25 depth planes within a sample volume and produces 25 images, one of each depth plane. Referring also to FIG. 4B, an example of a system 470 that images 25 depth planes is shown. The system 470 includes an MFG 472 that produces 25 diffractive orders, a color corrective grating (CCG) 474, a prism 476, a relay lens 478, and a sensor 480. The 25 diffractive orders form a 5×5 array on the sensor 480.

Returning to FIG. 4, the MFG 406 also causes chromatic dispersion of incoming light that has a bandwidth defined by the minimum wavelength ($\lambda$min) and the maximum wavelength ($\lambda$max). The chromatic dispersion results in the longer wavelengths in the incoming light propagating away from the MFG 406 at a higher angle than the shorter wavelengths.

Because the system 402 can be used for multi-color imaging, the system includes a correction module that removes or reduces the effects of the chromatic dispersion. To correct for the chromatic dispersion, the MFG 406 is followed by a diffractive element 409. However, in addition to correcting for chromatic dispersion, the diffractive element 409 can remove (or undo) the separation of the diffractive orders 408 and 410 (and the separation of the other six diffractive orders that are not shown). The direction of propagation of the light in the central order 407 is not affected by passing through the diffractive element 409. Thus, a refractive element 411 that maintains the separation of the non-central diffractive orders and directs the diffractive orders to distinct locations 420, 422, and 424 on the image plane 403 is placed after the diffractive element 409. The diffractive optical element 409 and the reflective optical element 411 can be collectively referred to as the correction module. The diffractive element 409 is discussed below with respect to FIG. 11 and the refractive element 411 is discussed below with respect to FIG. 12.

The diffractive orders 407, 408, and 410 propagate through the CCG 409. Passing the orders 408 and 410 through the CCG 409 corrects the orders 408 and 410 (and the other non-illustrated, non-central diffractive orders) for chromatic dispersion. Each diffractive order 407, 408, and 410 passes through the refractive optical element 411. The refractive optical element 411 maintains the separation of the diffractive orders 407, 408, and 410 and directs the diffractive orders 407, 408, and 410 towards the image plane 403. The refractive optical element 411 can be a faceted prism that includes the same number of facets as the number of diffraction orders that are generated by the MFG 406. The relay lens 412 focuses the diffractive orders 407, 408, and 410 at locations 420, 422, and 424, respectively, on the image plane 403 to form a three-dimensional representation of the volume 120, a focal stack 430.

The focal stack 430 here includes nine two-dimensional images, one for each diffraction order generated by the MFG 406. Each of the two-dimensional images is a focused and aberration-corrected image of a two-dimensional (2D) plane within the imaged volume. The nominal focus (z=0, shown at location 450) of the system 402, to which the module is attached, is the non-diffracted order 407, which produces the central tile 432 of the array of images 430. Each of the eight tiles that surround the center image 432 is a refocused image of one of the out-of-focus planes in the sample. Each of the out-of-focus planes is separated from the next nearest sample plane by a distance equal to one focus step ($\Delta z$). For example, the image 434 is an image of a sample plane 452 that is spaced four focal steps ($4\Delta z$) deeper into the sample than the nominal focus (z=0) of the microscope. The image 434 corresponds to the location 420 on the image plane 403, and the image 432 corresponds to the location 422 on the image plane 403.

Thus, the focal stack 430 includes in-focus images of nine different depths, spaced $\Delta z$ apart (as indicated by the "z" value shown on each image in 430), within the imaged volume (the sample). As such, the system 402 generates the focal stack 430 without moving the sample, the microscope, the camera, or any of the components of the imaging system 402.

The combination of the MFG 406, the diffractive element 409, and the refractive element 411 provide multi-color, multi-dimensional, and aberration corrected images of a volume. The details of the MFG 406, the diffractive element 409, and the refractive element 406 are discussed below, beginning with the MFG 406.

The MFG 406 performs two functions. First, the MFG 406 separates incoming light by diffracting the light into diffractive orders 407 (the zeroth order), 408, and 410. Second, the MFG 406 refocuses the diffractive orders 408 and 410 so that the diffractive orders form an instant focal stack of images, with each image being a focused image of the sample at a particular depth plane. Initially, the separation function of the MFG 406 is discussed. A discussion of the refocusing function of the MFG 406 follows with respect to FIGS. 7, 8A, and 8B.

The MFG 406 is a diffractive optical element that diffracts incoming light according to a grating pattern (which is also referred to as the grating function) that is etched into or otherwise formed on the MFG 406. The grating splits and diffracts light into several beams ("diffractive orders") that propagate away from the MFG 406 in different directions. The propagation directions of the diffractive orders depend on the spacing ("d") of the grating pattern and the wavelength of the incident light. The two-dimensional pattern that the diffractive orders form downstream from the MFG 406 can be referred to as the "diffraction pattern."

The grating function can be a pattern of grooves, depressions, or indentations that are formed into a surface of the MFG 406 and separated by a center-to-center distance (grating spacing) "d." For example, FIG. 4A shows an example of a line grating 460 in which the groves are horizontal lines of an arbitrary, constant etch depth and that are separated by the center-to-center distance "d." In the example of the grating with horizontal lines, incoming light is separated into orders m=0, +/−1, +/−2, . . . . . The zeroth order (m=0) is not diffracted. The higher orders are deflected at an angle mν relative to the direction of propagation of the incoming light, where "m" is an integer number that corresponds to the number of the diffraction order. The angle ν is labeled as "a" in FIG. 4A. The angle ν is determined from the grating equation (Eq. 1)

$$m \sin(v) = (\lambda/d) \quad \text{(Eq. 1)}.$$

The spatial characteristics of the grating pattern determine which diffractive orders arise, in which directions the diffractive orders propagate, and how much energy goes into each order. With respect to multi-focus microscopy, this means that the grating pattern determines how much of the fluorescence emission light goes into each image in the focal series. As discussed below, in contrast to a typical line grating, the MFG 406 has a grating pattern that distributes light evenly among a sub-set of the diffractive orders. This allows the imaging system 402 to create an N×N array of even intensity images of the multiple depth planes of an imaged sample volume.

Referring to FIG. 5A, an example grating function 501 for a binary phase-only MFG 500 is shown. The pattern 501 shown in FIG. 5A is a unit that is repeated many times to cover the grating surface (by etching the surface of the MFG 406 with the pattern 501) of the MFG 406. The pattern is binary since it has only one etch depth (the depth of the grooves 502 as measured from a surface of a non-grooved portion 503).

In the grating pattern shown in 501, the pattern 502 replaces the lines of the line grating discussed above. The size of each unit of the pattern 502 is the grating spacing (or period) "d".

FIG. 5B shows an illustration of the altered point spread function (PSF) 504 of an ideal imaging system, when a grating the diffractive pattern 501 has been placed in the Fourier plane of that imaging system. The PSF 504 is a 3×3 array of diffractive orders that are produced by passing light through an MFG that has the grating pattern made from multiple instances of the grating function 501. The diffractive orders are $m_{x,y}$=0, +/−1, and each of the diffractive orders has the same light intensity. The spot marked 505 is the non-diffracted zeroth order ($m_{0,0}$) and is in the center of the 3×3 array. The diffractive order 509 corresponds to the order $m_{0,1}$ and is directly above the order 505, and the diffractive order 508 corresponds to the order $m_{0,-1}$ and is directly below the order 505. The diffractive order 510 corresponds to the order $m_{1,1}$ and is in the upper-right corner of the array.

FIG. 6A shows another grating function 601 for a binary phase-only MFG. The grating function 601 covers the surface of the MFG 406. In the grating function 601, the grooves 602 can be considered to replace the lines of the line grating discussed above, and the size of the each unit of the grating function 601 is the grating spacing "d" for an MFG that includes the pattern 601.

FIG. 6B shows an illustration of the altered point spread function (PSF) of an ideal imaging system where a grating with the diffractive pattern 601 has been placed in a Fourier plane. The PSF 603 is a 5×5 array of diffractive orders that are produced by passing light through an MFG that has the grating pattern 602. The diffractive orders are $m_{x,y}$=0, +/−1, +/−2 and each of the diffractive orders has the same light intensity. As compared to the grating function 501, an MFG that uses the grating function 601 allows implementation of a multi-focus microscope with twenty-five focal planes as compared to nine focal planes for an MFG that is based on the grating function 501. Such an MFG images 25 depth planes within an imaged sample volume.

The grating functions 501 and 601 are grating functions that generate fan-out arrays of evenly distributed diffractive orders.

The MFG 406 can be made from, for example, fused silica with the grating function 501 or the grating function 601 repeated on a surface of the fused silica. As discussed above with respect to Equation 1, the diffraction pattern depends on the wavelength (λ) of the incoming light. For an MFG that is designed for a nominal wavelength of 515 nm, the measured efficiency of the an MFG with a grating function based on the grating function 501 is about 65% with even intensity distribution among the images generated from the diffractive orders. The efficiency of an MFG that has a grating function based on the grating function 601 is about 77%. Using a multi-phase phase-only grating for the MFG 406 can increase efficiency. A multi-phase grating pattern for an MFG is discussed with respect to FIG. 9.

Figure 7:
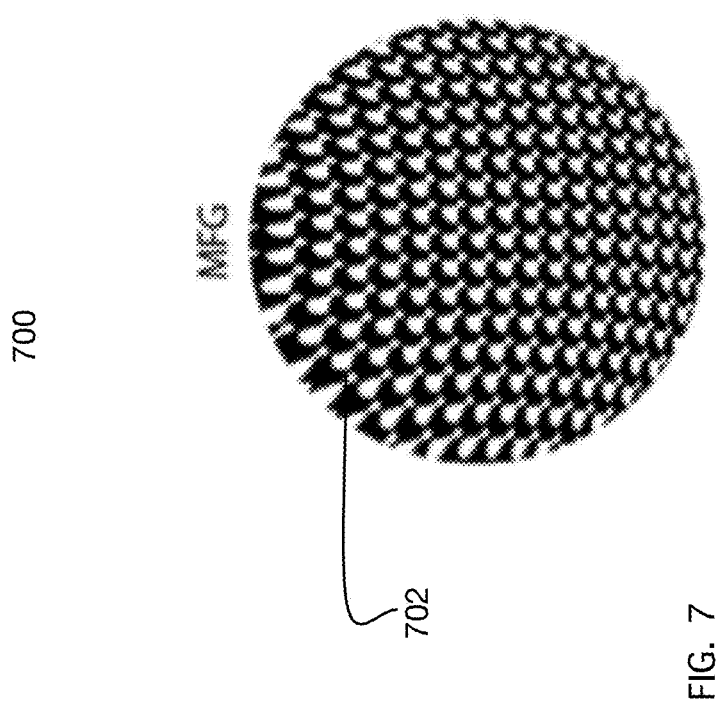
FIG. 7 is a schematic illustration of an example multi-focus diffraction grating.
Figure 8B:
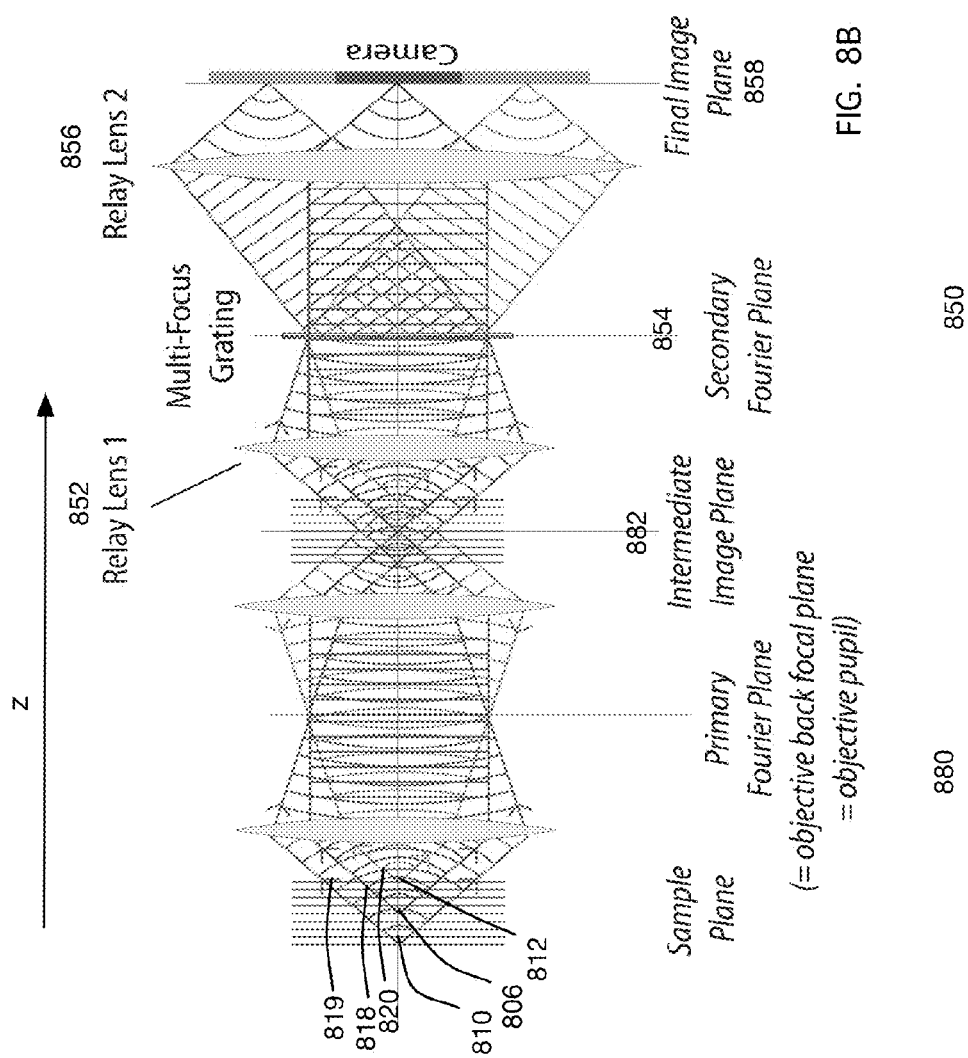

As discussed above, the MFG has two functions, separation of incoming light into diffractive orders and re-focusing of the diffractive orders that correspond to out-of-focus planes in the volume. The discussion above relates to the separation function of the MFG. The second function of the MFG, refocusing, is discussed next. FIGS. 7, 8A, and 8B show an example of the re-focusing that can be obtained from an MFG. The re-focusing is achieved because the MFG applies a phase shift that is equal to but opposite from a depth-induced phase error that is present on the light that emerges from the out-of-focus planes in the sample.

FIG. 7 shows a schematic front view of an example MFG 700 based on the grating function in FIG. 5A. FIG. 8A shows a side view of an imaging system that has an MFG based on the grating function shown in FIG. 5A placed in the Fourier plane of a microscope objective. FIG. 8B shows a side view of an imaging system that has the MFG placed in a secondary Fourier plane formed by a relay lens. The imaging systems FIGS. 8A and 8B are for simplicity here drawn without the chromatic correction module included in the imaging system 102, The MFG 700 is an MFG that has a grating pattern 702 that is formed by repeating instances of the grating function 501 (FIG. 5) and distorting the resulting pattern with a chirp in two directions. The distortion gives rise to a phase shift in the wavefront of the light that exits the MFG 700. When imaging deep into a sample volume, to a plane within the sample that is at a depth plane that is not at the nominal focal plane of the microscope objective (an out-of-focus plane), the microscope objective is used at a focal distance for which it is not designed. This gives rise to depth-induced spherical aberration, which deteriorates the image of the out-of-focus plane. To compensate for the spherical aberration, the defocus phase error ($\delta\phi(z)$) in the Fourier plane of a point source that is located at an out-of-focus plane at depth z in the sample is determined. The grating pattern of the MFG is distorted such that the grating pattern applies a phase shift that is equal but opposite of the defocus phase error. After correction for the defocus phase error with the MFG, light from the out-of-focus plane within the sample exits the MFG with a flat wave front and can be properly focused onto the same image plane as light that arises from the in-focus plane.

As discussed below, the chirp (distortion) of the grating pattern of the MFG 700 corrects the out-of-focus phase error by introducing a phase shift that is equal and opposite to the depth-induced phase error, thus focusing the images of the out-of-focus planes without moving the sample volume or the objective. As such, the MFG 700 provides aberration-free refocusing of multi-color light from multiple depth planes within an imaged sample volume. When the MFG 700 is used as the MFG 406 in the system 402, the MFG 700 separates and refocuses the light from the sample depths 122, 124, and 126.

Figure 19:
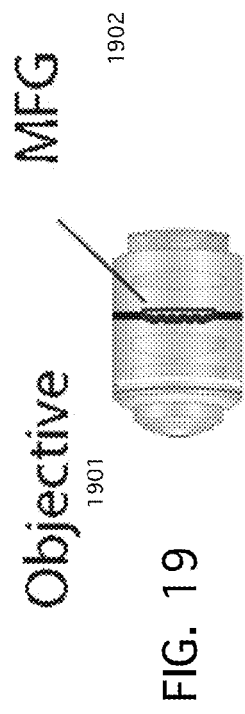
FIGS. 19 and 20 are schematic perspective cut-away views of an example microscope objective that includes a MFG.
Figure 20:
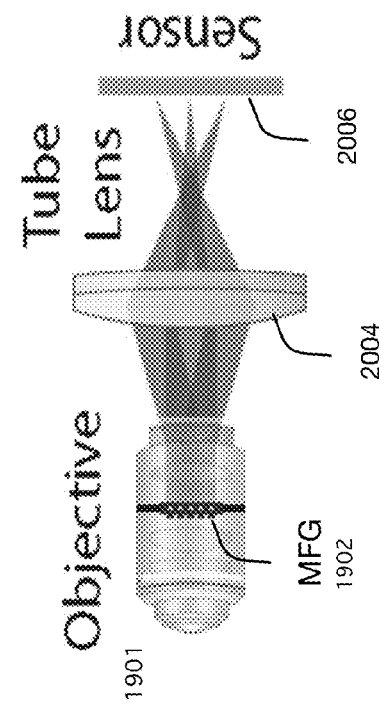

Referring also to FIG. 8A, the MFG 700 is used in the imaging system 800A. The imaging system 800 includes a microscope objective 802 and a tube lens 804. The microscope objective 802 and the MFG 700 can be combined into a self-contained unit. An illustration of such an implementation is shown in FIGS. 19 and 20.

Continuing with the discussion of FIG. 8A, the nominal focus of the microscope objective 802 is a plane 806. The nominal focus of the microscope objective 802 is a plane in the sample that is in focus without correction. The plane 806 is within a sample volume. In addition to the plane 806, the sample includes the depth planes 810 and 812, each of which is at a different depth within the sample volume. Rays 818 that emerge from the nominal focus plane 806 pass through the objective 802 and emerge, without further correction, with a flat wavefront that is focused to an image plane 816. In contrast, the focal planes 810 and 812 are spaced one focal step ($\Delta z$) away from the nominal focal plane 806 and are not at the nominal focus. Thus, when imaged by the objective 802 without correction, both the focal plane 810 and the focal plane 812 are out of focus, meaning that the rays 819 and 820 that emerge from the planes 810 and 812 are not focused to the image plane 816. Instead of passing through the objective 802 and exiting as a beam with a flat wavefront, after passing through the objective 802, rays 819 from the plane 810 have a converging wavefront and rays 820 from the plane 812 have a diverging wavefront.

However, the grating pattern 702 on the MFG 700 applies an opposite and equal phase shift to the rays 819 and 820 so that the rays 819 and 820 have flat wavefronts after passing through the MFG 700. After the rays 819 and 820 are corrected to have flat wavefronts, the lens 804 focuses the rays 819 and 820 to the image plane 816. Thus, the MFG 700 produces a diffractive order m=+1 that is a flat wavefront of light from the out-of-focus plane 812 and a diffractive order m=−1 that is a flat wavefront of light from the out-of-focus plane 810. Higher diffractive orders can be similarly corrected for phase errors. In this manner, the MFG 700 focuses light from out-of-focus planes within the sample 808 without moving any of the parts of the imaging system 800. When used as the MFG 406 in the imaging system 402 (FIG. 4), the MFG 700 applies a phase correction to the rays from out-of-focus planes such that each of the diffractive orders 408 and 410 exits the MFG 406 as a flat wavefront of light.

The phase shift is introduced by the geometrical distortion of the MFG pattern 702, and the phase shift is dependent on diffractive order so that each duplicate image in the N×N array of images obtains a focus shift of $\Delta z^*(m_x+N^*m_y)$, with $\Delta z$ being the distance in the "z" direction between the planes 806, 810, and 812. The magnitude of the distortion on the MFG determines $\Delta z$. For example, the MFG 700 can be designed to produce $\Delta z$ ranging from 250 mm to 2 μm, spanning 2.25-18 μm of sample depth. The determination of the distortion is discussed further below with respect to FIG. 15.

Figure 21:
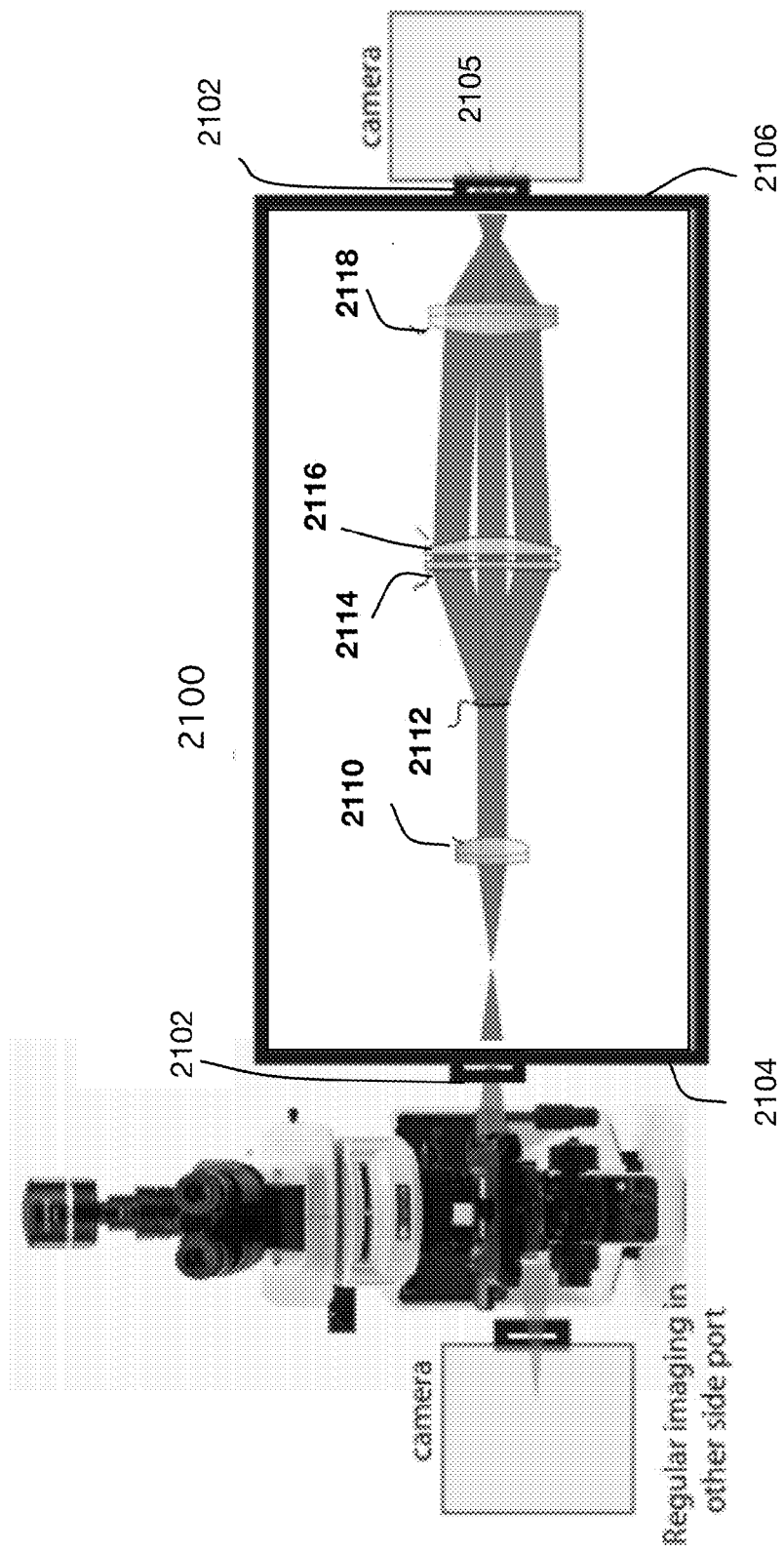
FIG. 21 is a schematic illustration of an example module that houses an MFM imaging system.

Referring to FIG. 8B, the MFG 700 is used in an imaging system 800B that includes two relay lenses. The configuration of 800B can be used in an add-on module that is appended to a camera port of a microscope or another imaging system. A perspective view of an example of such an add-on module is shown in FIG. 21.

The system 800B includes a module 850 that is appended to an imaging system 880. The module 850 includes the components that are to the right (in the "z" direction) of the intermediate image plane 882, and the imaging system 880 includes the components to the left of the plane 882. The imaging system 880 can be, for example, a microscope or a photographic camera. The imaging system 880 has a nominal focus at the plane 806 within a sample volume. The imaging system 880 forms an image at an intermediate image plane 882. The module 850 includes a first relay lens 852 that forms a secondary Fourier plane 854. The module 850 also includes a second relay lens 856 that forms a final image plane 858. The MFG 700 is placed in the secondary Fourier plane 854.

Rays 818 that emerge from the nominal focus plane 806 exit the imaging system 880, pass through the relay lens 852 and emerge, without further correction, with a flat wavefront. In contrast, the rays 819 and 820 that emerge from the out-of-focus planes 810 and 812 do not emerge from the relay lens 852 with a flat wavefront. Instead, the rays 819 from the plane 810 have a converging wavefront and rays 820 from the plane 812 have a diverging wavefront. The grating pattern 702 on the MFG 700 applies an opposite and equal phase shift to the rays 819 and 820 so that the rays 819 and 820 have flat wavefronts after passing through the MFG 700. After the rays 819 and 820 are corrected to have flat wavefronts, the second lens 856 focuses the rays 819 and 820 to the image plane 858.

Thus, the MFG 700 can be used in a self-contained imaging system that images a sample volume or in a separate system that is appended to an imaging system that images the sample volume.

Referring to FIG. 9A, a front view of an example multi-phase phase-only diffraction grating is shown. FIG. 9B is an illustration of the diffractive orders it produces.

The grating 900 has a multi-phase grating pattern 901. The grating 900 can be used as the MFG 106 in the imaging system 102 or as the MFG 406 in the imaging system 402. As compared to the binary phase-only grating patterns 501 (FIG. 5A) and 601 (FIG. 6A), the surface of the multi-phase grating pattern 901 has multiple different groove depths (indentations or valleys in the surface). The different groove depths can be considered to be a grayscale transition as compared to the binary transition of a binary phase grating.

The multi-phase grating pattern 901 is an 8-phase pattern that has 8 different etch depths between the groove depth of groove 904 and the surface 902. An MFG that employs the grating pattern 901 provides light efficiency of about 89%. As compared to a binary phase-only grating (such as a grating made with the grating function 501 or 601), a multi-phase diffraction grating can provide improved light efficiency, thus providing additional signal for the images and data collected with the imaging system 102.

As shown by the PSF of FIG. 9B, a multi-phase MFG made with the pattern 901 produces nine diffraction orders in a 3×3 array.

As discussed above, the MFG 406 causes chromatic dispersion when used with multi-color (multi-wavelength) light. Even for light with a relatively narrow wavelength spectrum, such as the approximately 30 nm bandwidth of a single fluorophore, the MFG 406 can cause chromatic dispersion that can limit the resolution of images produced by the system 402. To correct for the chromatic dispersion, a color corrective grating (CCG) 409 (FIG. 4) is placed after the MFG 406. However, in addition to removing the chromatic dispersion, the CCG 409 also reverses the separation of the diffractive orders obtained by the MFG 406. To maintain the separation of the diffractive orders, a refractive optical element 411 is placed after the CCG 409. The refractive optical element 411 maintains the separation of the diffractive orders and directs the diffractive orders to different locations on the image plane 403 (FIG. 4).

Figure 13:
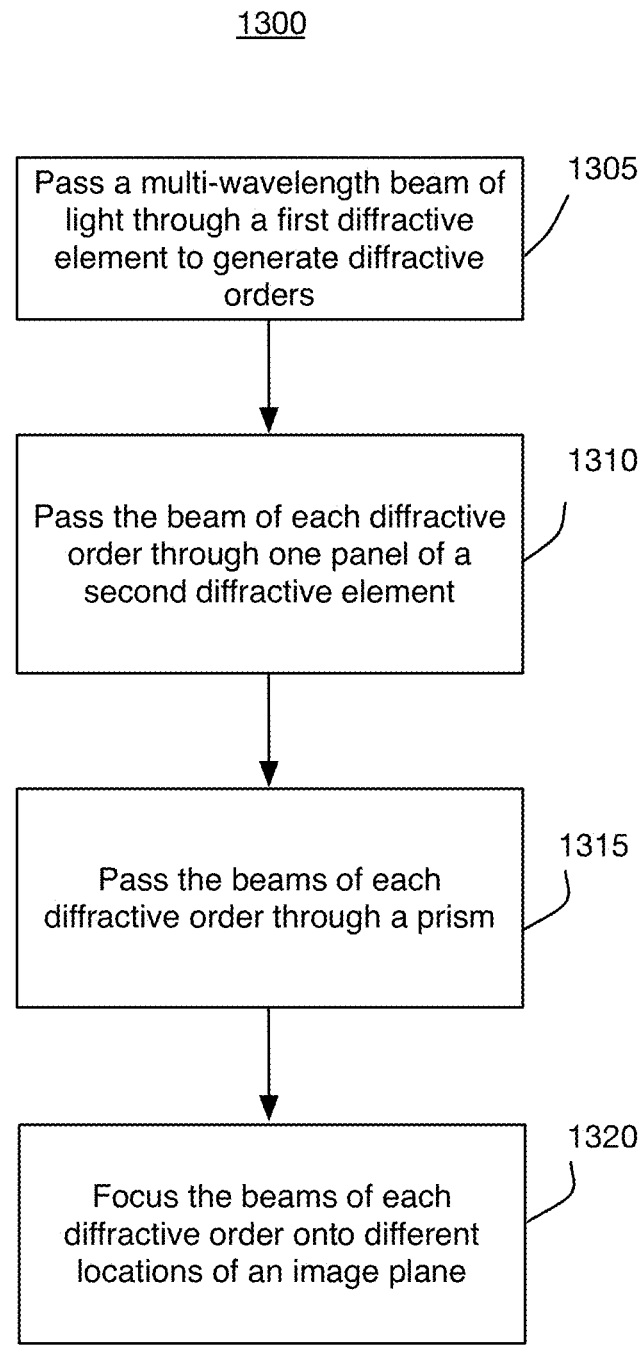
FIG. 13 is an example process for generating a three-dimensional representation of an imaged volume.

FIGS. 10 and 11 discuss the CCG 409 and FIG. 12 discusses the refractive optical element 411. FIG. 13 discusses the operation of the CCG 409 and the refractive optical element 411 when these elements are used together in an imaging system.

FIG. 10 shows a side view of an example binary phase grating 1010 that passes multi-color light to an example blazed grating 1020. The blazed grating 1010 can be the CCG. As discussed above, the MFG 406 can be a binary phase grating. Thus, the example shown in FIG. 10 is illustrative of an effect that can occur with the MFG 406. Light traveling in the "z" direction passes through the binary phase grating 1010 and is diffracted into diffraction order 1025. For illustration purposes, other diffraction orders are not shown.

The diffraction order 1025 has chromatic dispersion from passing through the binary phase grating 1010 since, as discussed above, the angle at which the diffraction order is deflected relative to the direction of propagation of the incoming light depends on the wavelength ($\lambda$) of the incoming light. Thus, for multi-color incoming light having a bandwidth defined by a minimum and maximum wavelength, the minimum wavelength is deflected less than the maximum wavelength. This effect is known as chromatic dispersion, and results in the minimum and maximum wavelengths being focused to different locations, thus smearing out the image.

To correct the chromatic dispersion, the diffraction orders with chromatic dispersion are passed through a second diffractive element, the blazed grating 1020, which reverses the effect of the binary phase grating 1010. To reverse the chromatic dispersion, the blazed grating 1020 is spaced from the binary phase grating 1010 so that each of the diffractive orders passes through a separate panel on the blazed grating 1020. In the example shown in FIG. 10, the diffractive order 1025 passes through the panel 1030 of the blazed grating 1020. Other diffractive orders (not shown) pass through the other panels on the blazed grating 1020, but the other diffractive orders do not pass through the panel 1030.

FIG. 11 shows a front view of an example color correction grating (CCG) 1100. The CCG 1100 can be used as the second diffractive element 409 in the imaging system 402 (FIG. 4). The CCG 1100 includes panels 1110 and 1115 along two orthogonal dimensions, shown as the "x" and "y" directions in FIG. 11. The CCG 1120 also includes angular panels 1125 that are positioned to interact with the diagonal diffractive orders (such as the diffractive order 510 shown in FIG. 5B). Each of the panels 1110 and 1115 include blazed transmission gratings. The CCG 1100 has the same number of panels as the number of diffractive orders produced by the MFG that is placed before the CCG 1100. For example, if the CCG 1100 is used with an MFG that produces a 3×3 array of images, such as an MFG made with the pattern 501, the CCG 1100 includes nine panels, one for each diffractive order produced by the MFG. The example CCG 1100 includes nine panels. Additionally, the period of the spacing between the panels of the CCG 1100 can be set to preemptively account for chromatic dispersion that is caused by the downstream refractive optical element 110. The center of the CCG 1100 is blank to accommodate the zeroth order.

The CCG 1100 can be made from a material that is transparent to the light that emerges from the imaged sample. For example, the CCG can be made from fused silica. The CCG 1100 can be a single-piece element or a multi-piece element that has components that are joined together when in use. A single-piece element can provide advantages in alignment and can be more robust and stable than a multi-piece element.

Although the CCG 1100 removes the chromatic dispersion, the CCG also removes the separation of the diffractive orders that the MFG 406 provides. As discussed below, a faceted prism is placed after the CCG 109 to maintain the separation of the diffractive orders and direct the diffractive orders to the imaging plane.

FIG. 12 shows a perspective view of a prism 1200. The prism 1200 can be used as the refractive optical element 110 in the imaging system 402 (FIG. 4). The prism 1200 is placed close to the CCG 1100 so that the diffractive orders are still separated with the diffractive orders reach the prism 1200. The prism 1200 includes facets, such as the facet 1205. The facet 1205 is flat and is positioned to receive a single diffractive order. The prism 1200 includes as many facets as the number of diffractive orders produced by the MFG 406. The prism 1200 refracts the diffractive orders and directs the diffractive orders to different locations on the image plane according to the dispersive power of the prism 1200, Dprism=$(\eta-1)*\xi$, where $\eta$ is the index of refraction of the prism and $\xi$ is the prism angle. The prism 1200 can be made from, for example, fused silica.

The prism 1200 is shown as a monolithic element. However, this is not necessarily the case. In some implementations, the prism 1200 can be made out of individual elements that are coupled together in a non-permanent manner.

In some implementations, the prism 1200 can also incorporate the CCG 1100 by making each prism facet 1205 a grism with a surface that includes a blazed grating.

Referring to FIG. 13, an example process 1300 for generating a three-dimensional representation (a focal stack) of an imaged volume is shown. The example process 1300 can be performed using the imaging system 102 or the imaging system 402.

A multi-wavelength beam of light is passed through a first diffractive element to generate diffractive orders (1310). The multi-wavelength beam of light can be, for example light reflected by or transmitted through a volumetric biological sample, such as the volume 120. The light can have a bandwidth that spans all or almost the entire visible spectrum, or a bandwidth that is a subset of the visible spectrum. The light can be multi-wavelength ultraviolet or infrared light. The multi-wavelength beam of light can include ultraviolet, visible, and/or infrared light. The multi-wavelength beam of light can be fluorescence emitted from depths within the volume 120. The fluorescence can have a bandwidth of about 30 nm to about 50 nm. The first diffractive element can be, for example, the MFG 106, 406, 700, 900, or an MFG made with the patterns 501 or 601.

Passing the multi-wavelength beam of light through the first diffractive element generates diffractive orders m=0,+/−1,+/−2 . . . +/−N, depending on the grating pattern of the diffractive element. Each of the diffractive orders propagate away from the first diffractive element in a different direction, with the zeroth order (m=0) propagating away from the first diffractive element in the same direction as the direction of propagation of the incident light. Each of the diffractive orders is a multi-wavelength beam of light and includes the same wavelengths that are included in the beam of light that is incident on the first diffractive element. The intensity of all of the light in the diffractive orders can be adjusted (by optimizing the grating function) either to be the same or to compensate for uneven light loss in the different diffractive orders when they are transmitted through the chromatic correction elements. Because the optical element is diffractive, when the incident light is not monochromatic the diffractive orders produced have chromatic dispersion.

Each of the diffractive orders is passed through a different panel of a second diffractive optical element (1320). The second diffractive optical element is designed to reverse the chromatic dispersion of the first diffractive optical element. Passing the diffractive orders through the second diffractive element removes the chromatic dispersion. The second diffractive optical element can be the diffractive optical element 109, the diffractive optical element 409, or the CCG 1100. Each one of the diffractive orders can be passed through a different panel of the second diffractive optical element. To achieve this, the CCG 1100 is placed relative to the MFG 406 so that each diffractive order passes through its own designated panel on the CCG 1100. Additionally, the CCG 1100 can be designed to have the same number of panels as the number of diffractive orders that the MFG produces.

The diffractive orders are passed through a prism (1330). The prism can be, for example, the prism 1200 (FIG. 12) or the refractive optical element 411 (FIG. 4). Although the second diffractive element removes the chromatic dispersion from the diffractive orders, the second diffractive element also removes the separation between the diffractive orders. Each of the diffractive orders corresponds to one depth plane within the imaged volume 120. To form an image of all of the depth planes simultaneously, the diffractive orders should remain separated so that the images of the various depth planes can be formed at different locations on the sensor 150. If the diffractive orders merge spatially, the images of the various depth planes will overlap on the sensor, failing to create a 3D image of the imaged volume 120. Passing the diffractive orders through the prism maintains the spatial separation of the diffractive orders. The prism 1200 includes facets 1205. The facets 1205 are flat regions on a surface of the prism 1200 that receives light. The prism 1200 has as many facets as the number of diffractive orders produced by the MFG 406. Each of the diffractive orders passes through a corresponding facet. The prism 1200 maintains the separation among the diffractive orders and directs the diffractive orders to distinct portions of the image plane 403 (FIG. 4).

The beams of the diffractive orders are focused to different portions of the image plane 403 (1320). As discussed above, each diffractive order corresponds to a different depth plane in the sample 120. Focusing the diffractive orders onto different portions of the image plane 403 ensures that the images for each depth plane are separated and can be individually analyzed.

Figure 14:
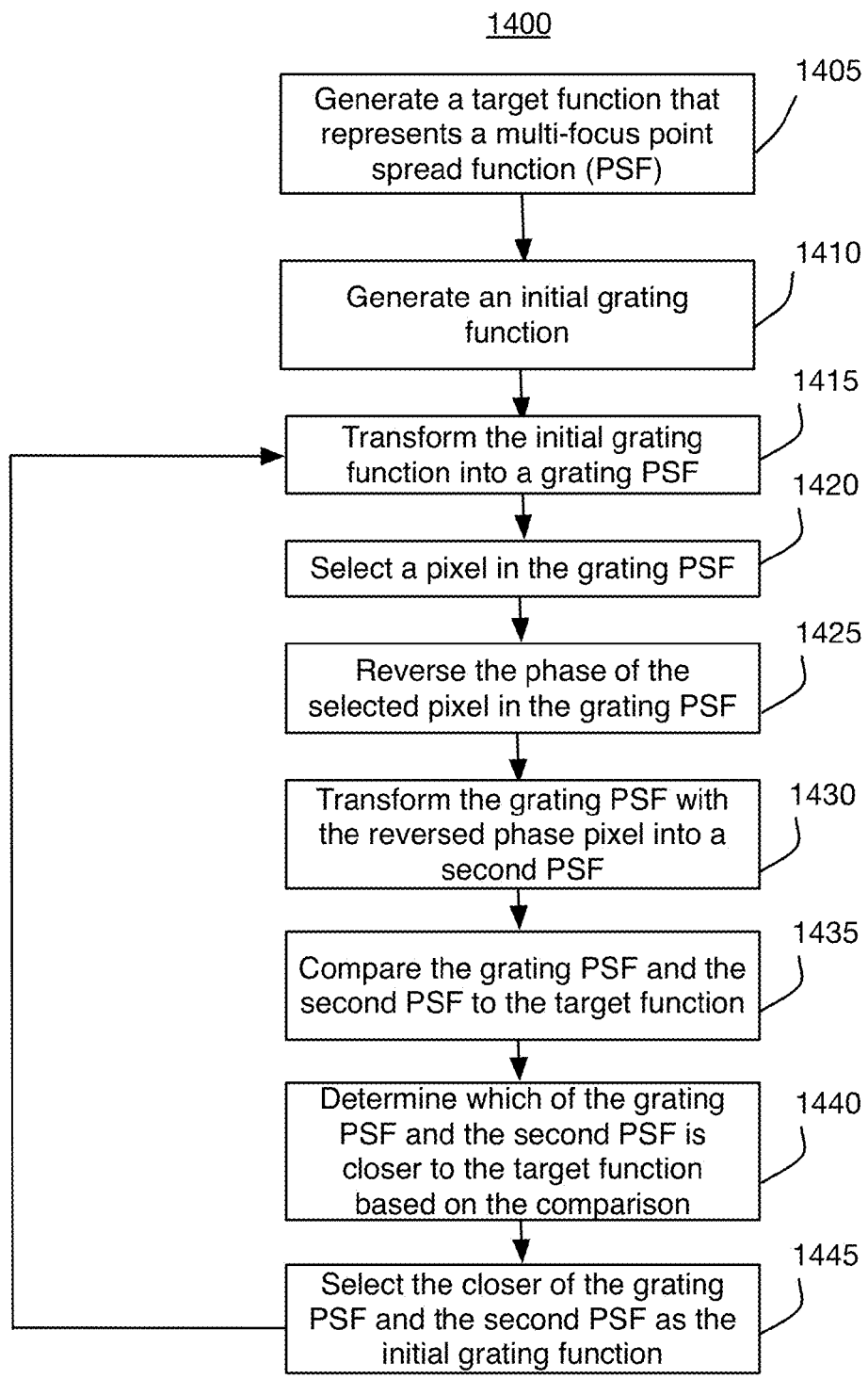
FIG. 14 is an example process for determining a grating function for a multi-focus grating (MFG).

FIG. 14 shows an example process 1400 for determining a grating pattern for an MFG.

In a phase-only diffractive grating, the shape of the grating pattern and the etch depth (the depths of the grooves or indentations that are formed on a surface through which light passes) constitute the grating function and determine the energy distribution among the diffractive orders. To optimize light efficiency in multi-focus microscopy applications that image volumes based on fluorescence emitted from the sample volume, the grating function of the MFG is designed so that fluorescence emission light from the sample is directed with maximum efficiency into the diffraction orders that are chosen for imaging. Furthermore, light should be distributed evenly among the diffractive orders, so that a minimal exposure time can be used to record each multi-focus image while still getting sufficient signal to image each depth plane and to obtain an even signal throughout the 3D image. The process 1400 can be used to determine a grating pattern for an MFG.

A target function that represents a target (desired) multi-focus point spread function (PSF) is generated (1405). The PSF is a two-dimensional representation of the diffractive orders that pass through the MFG when placed in an ideal imaging system. The amplitude point spread function (PSF) of an imaging system can be calculated as the square of the Fourier transform of the pupil function. In MFM, the pupil function is modified by the phase-shift of the MFG, which we can model with a matrix G. The altered PSF of an aberration-free microscope where the MFG is inserted in the Fourier plane is then given by the square of the Fourier transform of the matrix G. This property can be used to optimize the grating pattern, as described below.

A matrix (T) is generated to represent the target function, and the target function represents the desired form of the multi-focus PSF. For example, for a system with nine planes (that is, an imaging system that produces an array of two-dimensional images of nine planes at different depths within an imaged volume), the desired PSF is a two-dimensional array of 3×3 points that are equally spaced, as bright as possible, and have the same light intensity. An example of a 3×3 array PSF is shown in FIG. 5B. For a system with twenty-five planes (an imaging system that produces an array of two-dimensional images of twenty-five planes of different depths within an imaged volume), the desired PSF is a two-dimensional array of 5×5 points that are equally spaced, as bright as possible, and have the same light intensity. An example of a 5×5 array PSF is shown in FIG. 6B.

An initial grating function is generated (1410). The grating function can be referred to as the phase grating (G). A starting guess for the phase grating G is made in the form of a matrix of randomly distributed black (−1) and white (+1) pixels representing phase shifts 0 and π, respectively.

The initial grating function is transformed into a grating PSF (1415). For example, the matrix G can be transformed by a Fourier transformation, yielding the complex-valued PSF* which is squared to yield the real-valued, amplitude PSF. The real-valued amplitude PSF can be considered as MFM PSF. A pixel in the grating PSF is selected (1420). The pixel can be selected at random. The selected pixel is flipped to the opposite phase (1430). To flip a pixel to the opposite phase, a pixel that is initially valued at −1 (black) is changed to a value of 1 (white), and vise versa. The resulting matrix (with the flipped pixel) is transformed, yielding a new PSF (1440). The transformation can be a Fourier transform. The two PSFs (the new PSF and the grating PSF) are compared to the target function T. The pattern that gives a PSF with a better resemblance to T is kept as the new matrix G (1445).

The process 1400 can continue by stepping through all the pixels in G in a randomized fashion and flipping the pixel to the opposite phase if this gives better resemblance to the target function T. The process 1400 terminates when a local minimum is reached. A local minimum is reached when no pixels are flipped to the opposite phase during a round of stepping through all the pixels of the matrix G. The process 1400 is not required to converge to an absolute minimum. Calculated efficiency of our version of the MFG pattern was 67%, and measured efficiency of our MFG based on this pattern was measured to be 65% with evenness between focal planes. A grating pattern that produced a PSF with 5×5=25 points had a calculated efficiency of 78%.

Figure 15:
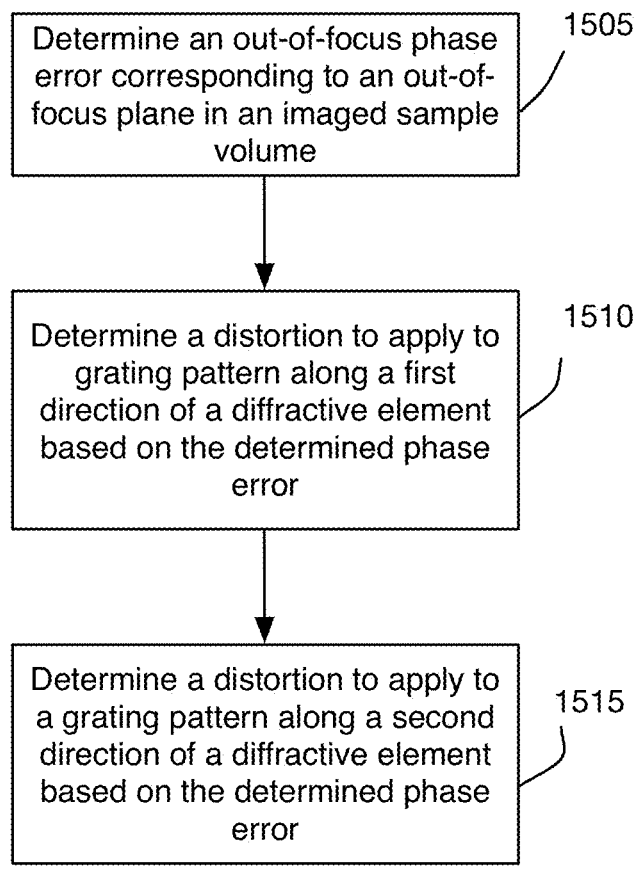
FIG. 15 is an example process for determining a distortion to apply to a grating pattern.

FIG. 15 shows an example process 1500 for determining a distortion to apply to an MFG grating pattern. The distortion allows the MFG to focus incoming light.

The process 1500 can be used to determine a grating pattern for the MFG 106 or any of the other grating patterns for the MFGs discussed above. For example, the process 1500 can be used to determine the grating pattern 701 (FIG. 7). The process 1500 produces a distortion that, when applied to a periodic grating pattern (such as the grating functions 501 and 601), causes the grating pattern to focus the diffractive orders. The process 1500 can be performed by one or more electronic processors.

An out-of-focus phase error that corresponds to an out-of-focus plane in an imaged sample volume is determined (1505). The out-of-focus phase error can be represented by δφ(dz). Light from a point-source in the nominal focal plane has a flat wavefront in Fourier space, while wavefronts from defocused sources have a curvature and a defocus wavefront-error df(z). To form an image out-of-focus source, this wave-front error can be reversed so that the out-of-focus wavefront is flat. This task is performed by an MFG positioned in the pupil plane of a microscope objective (the back objective focal plane or the Fourier plane).

For each point $(x_p, y_p)$ in the pupil plane, the out-of-focus phase error df(z) of the wavefront from a point source located on the optical axis in a plane at defocus z from the nominal focal plane of the microscope objective. The expression $r_p=\sqrt{x_p^2+y_p^2}$ denotes the radial coordinate position in the pupil, and $r=r_p/R_p$ denotes the normalized radial coordinate, where $R_p=NA \times f_{obj}$ is the pupil radius and $f_{obj}$ the focal length of the objective. The numerical aperture (NA) is defined as NA=n×sin(a), where n is the diffractive index of the objective immersion medium (and sample) and a the highest incident ray angle collected by the objective. Assuming radial symmetry and using polar coordinates, a ray entering the objective at an angle q (q<a) has a defocus phase error expressed in Equation 2:

$$\delta\phi(z)=n \times k \times z \times \cos(\theta)=n \times k \times z \times \sqrt{1-\sin^2(\theta)} \qquad \text{Eq. (2)}$$

where k=2p/l (l is the sample fluorescence emission wavelength).

Using the Abbe sine condition, which states that r=sin(q)/sin(a), the angle q is related to radial position $r_p$ in the pupil plane, leading to Equation 3:

$$\sin^2(\theta)=\rho \times \sin^2(\alpha)=(r_p/R_p)^2 \times (R_p/n^2 f_{obj})^2 (r_p/n^2 f_{obj}^2)=(x_p^2+y_p^2)/n^2 f_{obj}^2 \qquad \text{Eq. (3)}$$

Here, the radial symmetry has been removed, to introduce the distortion in x and y individually, by returning to Cartesian coordinates. The defocus phase error for a plane at defocus z at every point $(x_p, y_p)$ in the pupil (or the out-of focus phase error) shown in Equation 4:

$$\delta\phi(z)=n \times k \times z \times \sqrt{1-(x_p^2+y_p^2)/n^2 f_{obj}^2} \qquad \text{Eq. (4)}$$

A geometrical distortion dx of a periodic grating pattern (with spacing d) in the pupil plane introduces a phase shift df in the diffracted wavefront, which is dependent on the diffractive order $m_x$ according to Equation 5:

$$\delta\phi_{m_x}(\delta x)=2\pi \times (\delta x/d) \times m_X \qquad \text{Eq. (5)}$$

To obtain a focal series in an N×N array of diffractive orders, the translation of the grating pattern is translated to be N times stronger in one order than the other, so that:

$$\delta\phi_{mx,my}(dz)=(m_x+Nxm_y)\delta\phi(dz)$$

A distortion to apply to a grating pattern along a first direction is determined (1510). A distortion to apply to a grating pattern along a second direction is determined (1515). To create a multifocus image that includes N×N planes with a constant focus step Δz, we impose a local distortion of the MFG grating pattern. The distortion functions for the grating pattern on the MFG are as follows in Equations 6 and 7:

$$\delta\phi(x_p,y_p)=(d/2\pi)\times\Delta z\times n\times k\sqrt{1-(x_p^2+y_p^2)/n^2f_{obj}^2}$$ Eq. (6)

$$\delta y(x_p,y_p)=N\times\delta x(x_p,y_p)$$ Eq. (7)

This gives a total focus shift in each diffractive order ($m_x$, $m_y$) of $Dz\times(m_x+N\times m_y)$. For example, with N=3 the order ($m_x$, $m_y$)=(+1,+1) gets focus shifted by $\Delta z\times(1+3\times1)=\Delta z\times 4$ and the zeroth order (0,0) gets no focus shift. These distortion functions produce the desired focal series of N×N planes with a constant focal step dz when applied to a periodic grating pattern. The nominal size of the basic pattern (described by the nominal grating spacing "d") controls the diffraction angle v and is adjusted to obtain proper separation of the array of N×N images on the sensor.

Figure 16:
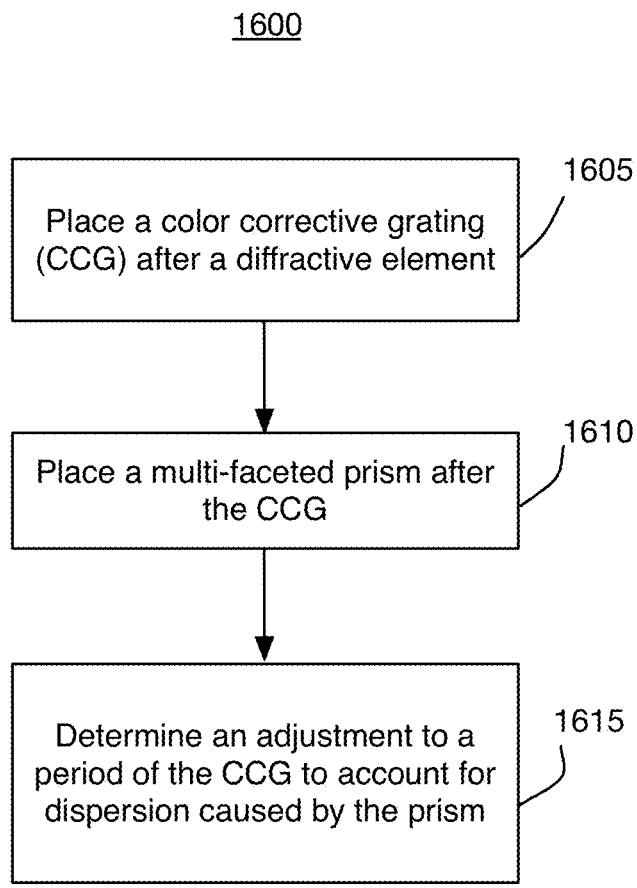
FIG. 16 is an example process for forming a chromatic correction module.

Referring to FIG. 16, an example process 1600 for forming or assembling a chromatic correction module is shown. The chromatic correction module produced by the process 1600 can be similar to the correction module 108 (FIG. 3). The chromatic correction module produced by the process 1600 can be used as the diffractive optical element 109 or 409 and the refractive optical element 110 in the system 102 (FIG. 3) or the system 402 (FIG. 4). The example process 1600 is discussed below with reference to FIG. 4.

A color corrective grating (CCG) 409 is placed after the MFG 406 (1605). After passing through the MFG 406, each horizontal and vertical diffractive order has a dispersion dl/d (where d is the average grating period the MFG pattern and dl the wavelength bandwidth imaged). Each diagonal diffractive order has a dispersion $\sqrt{2}\times\Delta\lambda/d$ due to geometry. If left uncorrected the dispersion caused by the MFG 406 would give rise to an outward smear in the image formed at the image plane 403. To correct for the chromatic dispersion, the CCG 409 is placed at a distance from the MFG 406 so that each diffractive order that exits the MFG 406 goes through a separate, designated panel on the CCG 409. In the individual blazed grating panels, >95% of the energy is distributed into the −1 (minus one) diffractive order. To reverse the dispersion from the MFG 406, the CCG 409 should therefore have a period equal to that of the MFG 406. That is the period of the CCG 409 ($d_{CCG}$) is expressed as: $d_{CCG}$=d.

If used alone, the CCG 409 would completely oppose the image-separating action of the MFG 406 and the diffractive orders would recombine to form a single image in the center of the image plane 403. Therefore, a multi-faceted prism 411 is placed after the CCG 409 (1610). The prism can be a multi-faceted refractive prism that has one facet for each diffractive order produced by the MFG 406. The prism 411 maintains image separation by deflecting the diffractive orders while they are still separated. The prism has a dispersive power $D_{prism}=(n_{silica}-1)\times x$, where $n_{silica}$ is the refractive index of the UV-grade fused silica prism and x is the prism angle. As such, the prism 411 also imparts some dispersion to light that passes through it. To account for the additional dispersion from the prism 411, the period of the CCG is adjusted (1615). In particular, the period of the CCG can be adjusted by a distance ($d_9$) to also remove the effect of the dispersive power of the prism, so that $d_{CCG}$=d+$d_p$ in the side panels and $\sqrt{2}\times d_{CCG}$ in the corner panels.

The light-efficiency of the chromatic correction module is determined by the efficiency of the blazed grating (better than 95%) and the transmittance of the (anti-reflection-coated) prism (also better than 95%). In summary, the process 1600 can be used to assemble a chromatic correction module that is effective, light-efficient and easy to incorporate in a straight beam path between the MFG 406 and the second relay lens 412. Because the chromatic correction module accounts for chromatic dispersion, the chromatic correction module can be used to image fluorophores from the entire visible spectrum.

FIGS. 17-23 show other implementations of MFM systems and/or components of MFM systems.

Figure 17:
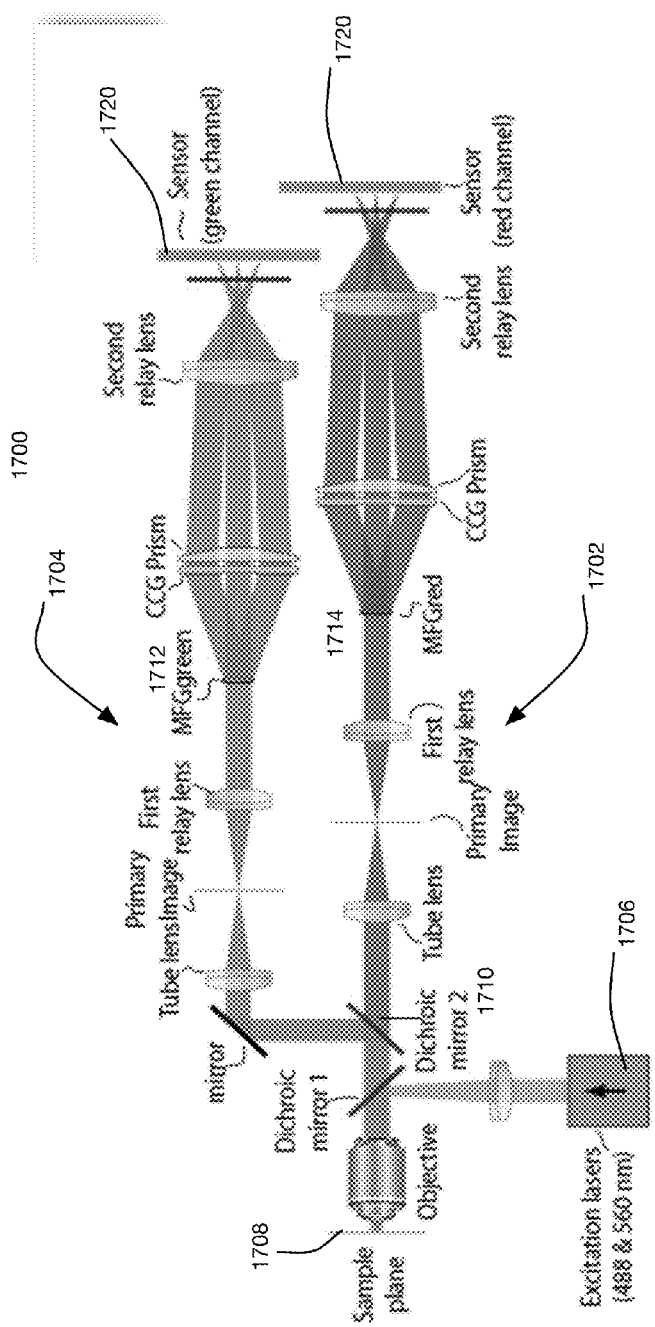
FIGS. 17 and 18 are side schematic views of multi-focus microscopy (MFM) imaging systems that include multiple color channels.
Figure 18:
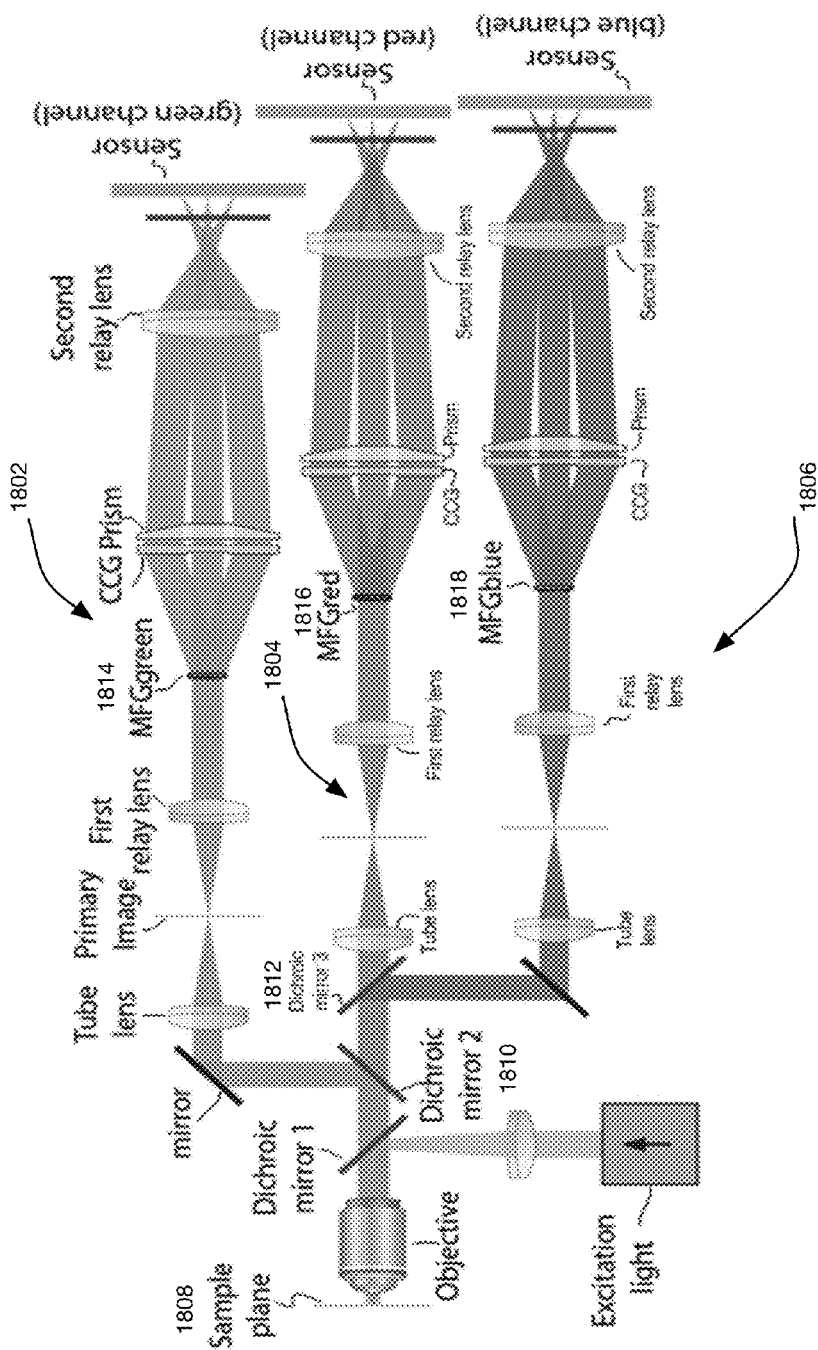

Referring to FIGS. 17 and 18, other examplary multi-focus microscopy (MFM) systems 1700 and 1800, respectively, are shown. Each of the systems 1700 and 1800 have multiple color channels, each of which includes an MFG that is designed or optimized for the color in the color channel. As discussed above, diffraction by a diffractive element (such as an MFG) is wavelength-dependent. Thus, an MFG designed for a nominal wavelength of, for example, 505 nm, operates differently when light with a wavelength of 488 nm is passed through the MFG. To design or optimize a system that receives broadband light, the MFM can include multiple color channels, each of which have an MFG that is designed or optimized for the wavelengths in that particular color channel.

As compared to MFM systems that use the same MFG for all colors, the systems 1700 and 1800 provide increased evenness of light intensity between focal planes. Although resolution and chromatic correction are highly efficient across the visible spectrum, the zeroth order (the diffraction order that is not deflected after passing through the MFG) becomes relatively stronger when using the same MFG for green, red, and blue light because the strength of the diffractive orders depends on the wavelength. To reduce or avoid this uneven light distribution among the images of the focal planes, color channels can be separated before the MFG and a separate MFG can be made for each color channel.

Referring to FIG. 17, an MFM system 1700 includes two color channels 1702 and 1704. In the example shown, the color channel 1702 is for red light, and the color channel 1704 is for green light. Broadband light from a light source 1706 is reflected onto a sample plane 1708, and light from the sample plane propagates towards the MFM system 1700. The light is incident on a dichroic mirror 1710, which transmits red light into the channel 1702 and reflects green light into the channel 1704. Each of the color channels 1702 and 1704 include components similar to those of the imaging system 402 discussed above. However, the color channel 1702 includes an MFG 1712 that has a grating pattern that is optimized for green light. Similarly, the color channel 1704 has an MFG 1714 with a grating pattern that is optimized for red light. Further, each of the color channels 1702 and 1704 are imaged on to separate cameras, the cameras 1720 and 1722, respectively. In some implementations, the bandwidth of light in each of the channels 1702 and 1704 is essentially monochromatic and has a bandwidth of about 1-2 nm.

Referring to FIG. 18, the MFM system 1800 includes three color channels 1802 (green light), 1804 (red light), and 1806 (blue light). The green light from the sample plane 1808 is separated by a dichroic mirror 1810. The red light and the blue light are separated by a dichroic mirror 1812. An MFG 1814 is placed in the color channel 1802, an MFG 1816 is placed in the color channel 1804, and an MFG 1818 is placed in the color channel 1806. Each of the MFGs 1814, 1816, and 1818 are optimized for the wavelengths of their respective color channels 1802, 1804, and 1806.

For both the systems 1700 and 1800, the MFG used for each color channel could be slightly different in design. From a production standpoint, the different MFGs could be efficiently produced because the same grating pattern (but with a different etch depth for the grooves or indentations) could be used for the different MFGs. This would allow efficient production by, for example, allowing use of the same lithography mask to make all of the MFGs. Additionally, in the system 1700 or 1800, each of which use multiple MFGs, the size of each of the CCGs and the prisms can be reduced as compared to the size of the CCG and prism used in a single-MFG system, such as the imaging system 402 (FIG. 4).

Referring to FIGS. 19 and 20, alternative placements of the MFG are shown. FIG. 19 shows a side perspective cut-away view of an example objective 1901. In the example of FIG. 19, an MFG 1902 is placed in the primary pupil plane (the Fourier plane of the objective 1901), inside the objective 1901. This placement of the MFG allows the MFM system to operate without the relay optics and without an appended imaging system. A CCG and/or prism can also be placed directly inside a microscope after the objective 1901 and before the tube lens of the microscope. The implementation shown in FIG. 19 offers a more compact design and higher efficiency because, by eliminating the relay lenses, the light from the sample does not pass through as many optical elements. Furthermore, the objective 1901 can be used with the MFG 1902 and without the CCG and/or prism in monochromatic imaging applications and in low-resolution applications where some chromatic dispersion can be tolerated.

FIG. 20 shows a side perspective cut-away view of the objective 1901, a tube lens 2004, and a sensor 2006. In the example of FIG. 20, the MFG 1902 is placed in the primary or secondary Fourier plane and used on its own without the CCG for single-wavelength (monochromatic) imaging. The MFG 1902 can be any of the MFGs described above.

Figures 22A, 22B:
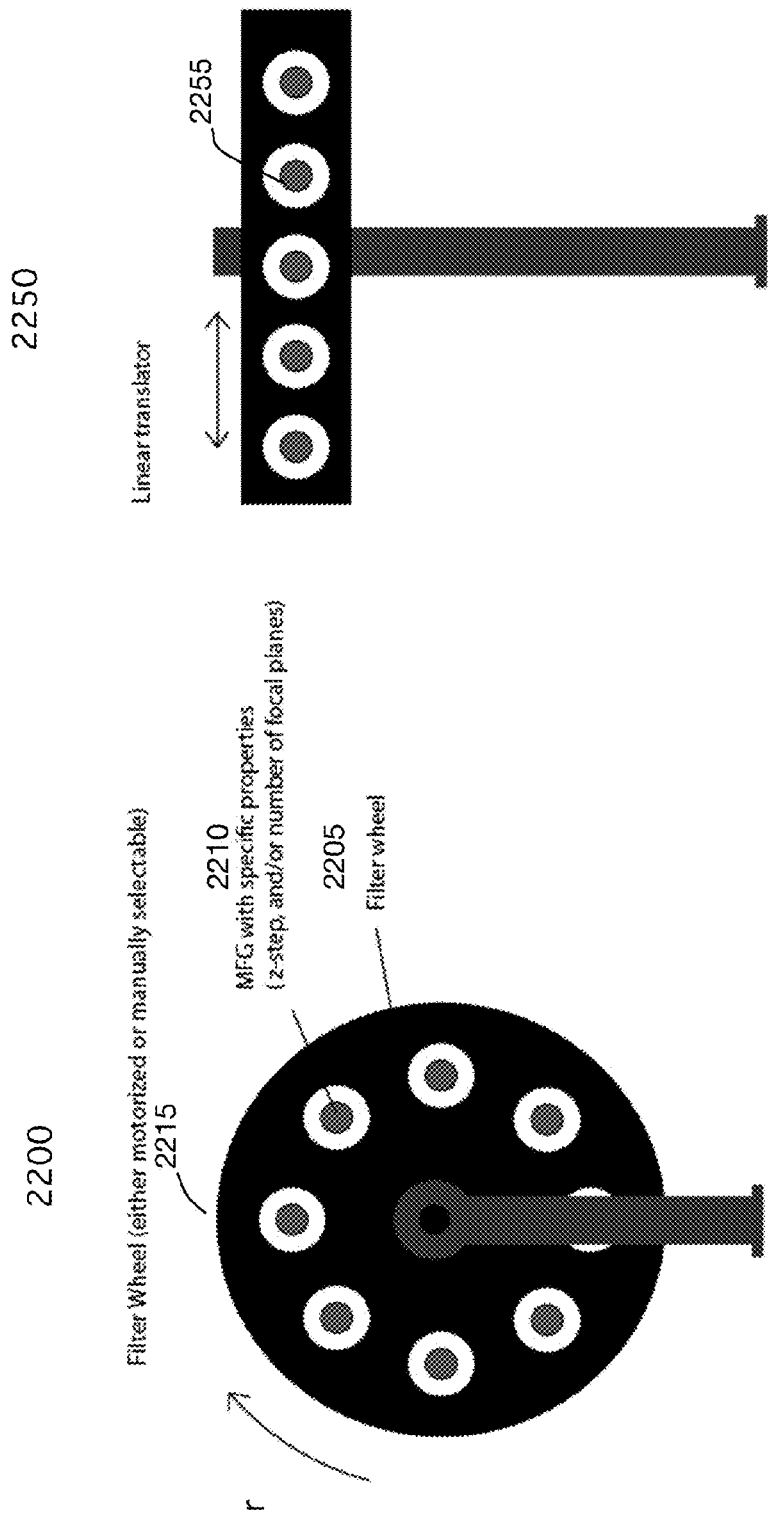
FIGS. 22A and 22B illustrate multi-element holders for an MFM imaging system.

Referring also to FIGS. 21, 22A, and 22B an application of an imaging system that includes an MFG system is shown. FIG. 21 shows a side view of an example imaging system that includes an MFG. FIGS. 22A and 22B show perspective views of the example imaging system at two different times.

Referring to FIG. 21, an example module 2100 houses an MFM imaging system. The module 2100 includes C-mounts 2102 on sides 2104 and 2106. The C-mounts 2102 allow the module 2100 to connect to a standard microscope port on side 2104 and to a camera 2105 on side 2106. The module 2100 includes a first relay lens 2110, an MFG 2112, a CCG 2114, a prism 2116, and a second relay lens 2118, each of which are fixed within the module 2100 so that the camera 2105 and microscope port are properly aligned to produce images when the module 2100 is connected to the camera 2105 and the microscope port.

The example of FIG. 21 shows a single color channel MFG, but the single MFG can also be used for multiple colors. The module 2100 can include multiple, separate MFGs for different color channels, as shown in FIGS. 17 and 18. The module 2100 also can include a multi-element holder (FIGS. 22A and 22B) that holds multiple different MFGs. The multi-element holder can include multiple different MFGs, each with a different grating pattern. As discussed above, the grating pattern determines the focus step and the number of depth planes, thus, such a multi-element holder allows real-time adjustment of the focus step and the number of depth planes. The multi-element holder can be adjustable between MFGs from a point external to the housing.

FIGS. 22A and 22B are illustrations of example multi-element holders. FIG. 22A shows a filter wheel multi-element holder 2200, and FIG. 22B shows a linear multi-element holder 2250. The filter wheel 2200 is rotatable in a direction "r." The filter wheel 2200 and the linear multi-element holder 2250 can move by manual operation or by a motor.

The filter wheel 2200 includes a wheel 2205 that defines multiple slots 2210, one or more of which can hold MFGs. The filter wheel 2200 is placed in a system such that one of the slots 2210 is positioned to receive light from an imaged volume. For example, the filter wheel 2200 can be mounted in a system such that location 2215 is in the path of the light from the imaged volume. Thus, the MFG that is in the slot that is aligned with the location 2215 is the selected MFG.

Each of the slots 2210 can hold a different MFG. As discussed above, an MFG can be optimized for a particular wavelength, produce a certain number of diffractive orders (image a certain number of depth planes in a sample volume), and have a defined focal step. Thus, moving the wheel 2205 in the direction "r" can allow real-time adjustment of the parameters that are controlled by the MFG.

In some implementations, the slots 2210 can hold dichroic mirrors or color filters and the filter wheel 2200 can be placed in front of a camera that images the sample volume. Rotating the filter wheel 2200 to change the dichroic mirror or change the color filter can allow a change in the color of light received by the camera. In this manner, a single channel can be used to image multiple colors.

The linear multi-element holder 2250 includes slots 2255, one or more of which can hold a filter or an MFG. The holder 2250 moves along a direction "l" to allow selection of a particular filter or MFG that is in a certain one of the slots 2255.

FIGS. 23, 24A, and 24B illustrate an example application of an MFM system that includes an MFG. In the application depicted in FIGS. 23, 24A, and 24B, the MFG is used "in reverse" as an illumination system with "steerable" light and provides direct control of a 3D illumination pattern on a sample. Thus, instead of imaging a sample, the systems of FIGS. 23, 24A, and 24B provide illumination of various three-dimensional (3D) regions in a sample volume. For example, the systems 23, 24A, and 24B can be used to illuminate a small three-dimensional region, such as a single neuron within a slice of brain tissue. In FIG. 23, an illumination array (or light array) 2301 includes multiple regions, each of which illuminates a specific region in the volume when emitting light. The illumination array may be an array of light emitting diodes (LEDs), a bright screen that can be activated in portions, or a light array with various portions that can be selectively activated.

A particular 3D region in the imaged sample volume is illuminated by turning on a portion of the illumination array that corresponds to the particular region. If all of the light sources in the illumination array are activated, the entire sample is illuminated. The MFM system delivers the light pattern to the sample through the MFG in the conjugate pupil plane of the objective. Such a system has applicability in, for example, two-photon microscopy and light-activation experiments in cultured neurons.

Other implementations are within the scope of the claims. For example, although imaging with multi-color light is discussed above, any of the systems can be used for monochromatic light (light with a bandwidth of about 1-2 nm).

What is claimed is:

1. An optical imaging system comprising:
   a first diffractive element configured to receive a multi-wavelength beam of light and separates the received beam of light into diffractive orders, each diffractive order comprising a multi-wavelength beam of light that propagates away from the first diffractive element in a different direction, the first diffractive element comprising a grating pattern configured to apply a focus shift to the diffractive orders;
   a second diffractive element comprising panels displaced along the second diffractive element in at least one direction, each panel positioned to receive and pass the multi-wavelength beam of one of the diffractive orders;
   a refractive optical element positioned to receive multi-wavelength beams of the diffractive orders that pass through the second diffractive element; and
   an optical lens that receives the multi-wavelength beams of the diffractive orders that pass through the refractive element and focuses each of the multi-wavelength beams of the diffractive orders to a different location on an image plane at the same time, wherein
   the grating pattern being configured to apply a focus shift to the diffractive orders comprises the grating pattern being configured to apply a phase shift to the diffractive orders.

2. The optical imaging system of claim 1, wherein, in use, the first diffractive element is positioned in the Fourier plane of a separate imaging system.

3. The system of claim 1, wherein the refractive element comprises a prism having a surface that receives the multi-wavelength beams of the diffractive orders that pass through the second diffractive element, the surface comprising facets that are substantially flat.

4. The system of claim 3, wherein each facet is positioned to receive the multi-wavelength beam of one of diffractive orders that passes through the second diffractive element.

5. The system of claim 3, wherein the prism is a single piece of material that transmits at least one wavelength in the multi-wavelength beam of light.

6. The system of claim 3, wherein the prism is formed from multiple pieces.

7. The system of claim 3, wherein the second diffractive element comprises a blazed diffraction grating.

8. The optical imaging system of claim 3, wherein the faceted prism comprises a plurality of facets, a number of facets being the same as a number of generated diffraction orders.

9. The optical imaging system of claim 3, wherein the second diffractive element and the refractive optical element are part of a single physical element, and each facet of the prism comprises a blazed grating.

10. The optical imaging system of claim 3, wherein the prism is non-monolithic and comprises a plurality separate elements.

11. The system of claim 1, wherein the second diffractive element comprises panels in a periodic arrangement extending along a surface of the second diffractive element in two directions that are orthogonal to each other.

12. The system of claim 1, wherein the second diffractive element is a single piece.

13. The system of claim 1, wherein the second diffractive element comprises multiple-pieces that, in use, are assembled together to form the second diffractive element.

14. The system of claim 1, wherein the first diffractive element introduces chromatic dispersion onto the diffractive orders, and passing the diffractive orders through the second diffractive element removes substantially all of the chromatic dispersion over a wavelength bandwidth.

15. The system of claim 14, wherein the wavelength bandwidth is about 30-50 nm.

16. The system of claim 1, wherein the first diffractive element comprises one of a binary or multi-phase phase-only diffraction grating.

17. The system of claim 1, further comprising a housing that encloses the first diffractive element, the second diffractive element, the refractive element, and the lens, wherein the housing defines a first opening on a first side, the first opening positioned to allow light to enter the housing and propagate towards the first diffractive element, and the housing defines a second opening on a second side, the second opening positioned to receive light exiting the lens.

18. The system of claim 17, wherein the housing comprises:
   a connection on the first opening to couple the first opening to a camera port of a microscope, followed by an optical lens that forms a Fourier plane where the first diffractive element is positioned, and
   a connection on the second opening to couple the second opening to a camera.

19. The system of claim 1, wherein the multi-wavelength beam of light that the first diffractive element receives comprises light from multiple depths within an imaged volume, and each of the multi-wavelength beams focused at a different location on the image plane corresponds to an image of the volume at one of the depths.

20. The system of claim 19, wherein the multi-wavelength beam of light comprises an output beam from one of a microscope or a photographic camera.

21. The system of claim 19, further comprising a multi-element holder with selectable positions, each position comprising a different diffractive element, and wherein selection of a particular diffractive element determines a distance between each of the multiple depths.

22. The system of claim 21, further comprising a housing that contains the first diffractive element, the second diffractive element, the refractive element, the multi-element holder, and the lens, and wherein the elements of the multi-element holder are selectable from an exterior of the housing.

23. The system of claim 1, wherein the first diffractive element is inside of an imaging objective.

24. The system of claim 1, wherein the multi-wavelength beam of light comprises fluorescence from an illuminated biological sample.

25. The system of claim 1, wherein the multi-wavelength beam of light comprises a wavelength band selected such that the second diffractive element removes all residual chromatic dispersion.

26. The system of claim 1, wherein the optical lens that focuses each of the multi-wavelength beams of the diffractive orders comprises an array of lenses.

27. The optical imaging system of claim 1, wherein the first diffractive element comprises a surface positioned to receive the multi-wavelength beam of light, and the grating pattern comprises grooves formed in the surface, the grooves having more than two different groove depths relative to the surface.

28. The optical imaging system of claim 1, wherein each diffractive order comprises light from a particular depth in a volume sample, and the grating pattern applies a phase shift to each diffractive order that is equal to a depth-induced phase error of the depth associated with the diffractive order.

29. The optical imaging system of claim 1, wherein the grating pattern is based on the Abbe sine condition.

30. An imaging system comprising:
a dichroic mirror positioned to receive a multi-wavelength beam of light;
a first color channel and a second color channel that receive, respectively, a light beam of a first color from the dichroic mirror and a light beam of a second color from the dichroic mirror; wherein each of the first color channel and the second color channel comprise:
a first diffractive element comprising a diffraction pattern, the first diffractive element configured to separate the light beam into diffractive orders, each diffractive order comprising a beam of light,
a module comprising a second diffractive element and a refractive element, the module being positioned to receive and transmit the diffractive orders that propagate away from the first diffractive element, and
a lens that receives the beams of the diffractive orders that pass through the module and focuses each of the beams to a different location on an image plane at the same time, wherein
the first diffractive element in the first color channel has a diffraction pattern that is proportional to a wavelength of the first color,
the first diffractive element in the second color channel has a grating pattern that is proportional to a wavelength of the second color, and
each of the grating patterns of the first color channel, the second color channel, and the third color channel is configured to apply a focus shift.

31. The imaging system of claim 30, wherein applying a focus shift comprises applying an amount of re-focus to the multiple beams, the amount of re-focus being determined based on the Abbe sine condition.

32. A method of imaging, the method comprising:
passing a multi-wavelength beam of light through a first diffractive element to generate diffractive orders, each diffractive order comprising a multi-wavelength beam of light that propagates away from the first diffractive element in a different direction, wherein the first diffractive element applies a focus shift to each of the diffractive orders, the focus shift comprising an amount of re-focus determined by the Abbe sine condition;
passing each of the beams of the multiple diffractive orders through a different panel of a second diffractive element; and
passing the beams of the multiple diffractive orders that pass through the second diffractive element through a refractive element.

33. The method of claim 32, further comprising:
passing the beams of the diffractive orders that exit the refractive element through a lens to focus the beams onto the different locations of the imaging plane.

34. The method of claim 32, wherein the refractive element comprises a prism.

35. The method of claim 34, wherein passing the beams of the multiple diffractive orders through the refractive element comprises passing each of the beams of the diffractive orders through a different facet of the prism.

36. The method of claim 34, wherein the prism comprises a surface comprising facets.

37. The method of claim 36, wherein the faceted prism comprises a plurality of facets, a number of facets being the same as a number of generated diffraction orders.

38. A method of generating a three-dimensional representation of a volume of material, the method comprising:
receiving a multi-wavelength beam of light, the beam of light comprising light from different depths within a volume of material;
diffracting the received multi-wavelength beam of light into multiple beams that are spatially distinct from each other, each of the multiple beams comprising light from a particular one of the different depths within the volume of material;
applying a focus shift to the multiple beams to generate multiple focus-shifted and spatially distinct beams;
correcting the multiple focus-shifted beams that are spatially distinct from each other for chromatic dispersion;
directing each of the multiple beams that are spatially distinct from each other onto a different portion of an image plane at substantially the same time; and
generating a three-dimensional representation of the volume of material based on the directed multiple beams, the three-dimensional representation of the volume of material comprising a two-dimensional image of two or more of the different depths within the volume of material, wherein applying a focus shift to the multiple beams comprises applying a phase shift that is opposite to a depth-induced phase error.

39. The method of claim 38, wherein applying a focus shift to the multiple beams comprises applying an amount of re-focus to the multiple beams, the amount of re-focus being determined based on the Abbe sine condition.

40. A method of generating a three-dimensional representation of a volume of material, the method comprising:
receiving a multi-wavelength beam of light, the beam of light comprising light from different depths within a volume of material;
diffracting the received multi-wavelength beam of light into multiple beams that are spatially distinct from each other, each of the multiple beams comprising light from a particular one of the different depths within the volume of material;
applying a focus shift to the multiple beams to generate multiple focus-shifted and spatially distinct beams, wherein applying a focus shift to the multiple beams comprises applying an amount of re-focus to the multiple beams, the amount of re-focus being determined based on the Abbe sine condition;
correcting the multiple focus-shifted beams that are spatially distinct from each other for chromatic dispersion;
directing each of the multiple beams that are spatially distinct from each other onto a different portion of an image plane at substantially the same time; and
generating a three-dimensional representation of the volume of material based on the directed multiple beams, the three-dimensional representation of the volume of material comprising a two-dimensional image of two or more of the different depths within the volume of material.

41. The method of claim 40, wherein directing each of the multiple beams that are spatially distinct from each other comprises focusing each of the multiple beams onto different portions of the image plane.

42. The method of claim 40, wherein the received multi-wavelength beam of light is diffracted and the focus shift is applied at a single diffractive optical element.

43. The method of claim 40, wherein diffracting the received beam of light into multiple beams that are spatially distinct from each other comprises diffracting the intensity of the received beam of light evenly into the multiple beams.

44. The method of claim 40, wherein the sample volume has a depth of at least 2.5 microns (μm).

* * * * *